(12) United States Patent
Ido et al.

(10) Patent No.: US 6,739,764 B2
(45) Date of Patent: May 25, 2004

(54) OPTICAL MODULE AND OPTICAL COMMUNICATION SYSTEM

(75) Inventors: Tatemi Ido, Kodaira (JP); Kouji Yoshida, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 10/156,925

(22) Filed: May 30, 2002

(65) Prior Publication Data

US 2002/0181853 A1 Dec. 5, 2002

(30) Foreign Application Priority Data

Jun. 1, 2001 (JP) ........................................ 2001-166250

(51) Int. Cl.[7] ................................................ G02B 6/36
(52) U.S. Cl. .............................. 385/92; 385/88; 385/93; 385/94
(58) Field of Search ............................. 385/1, 3, 4, 11, 385/88–94

(56) References Cited

U.S. PATENT DOCUMENTS 5,011,256 A  * 4/1991 Johnson et al. ................ 385/92

2003/0059175 A1 * 3/2003 Bendelli et al. .............. 385/92

FOREIGN PATENT DOCUMENTS

| JP | 07-063957 | 8/1993 |
| JP | 09-318849 | 5/1996 |
| JP | 10-012808 | 6/1996 |
| JP | 10-170771 | 12/1996 |
| JP | 10-293230 | 4/1997 |
| JP | 2000-164742 | 11/1998 |

* cited by examiner

*Primary Examiner*—Phan T. H. Palmer
(74) *Attorney, Agent, or Firm*—Reed Smith LLP; Stanley P. Fisher, Esq.; Juan Carlos Am Marquez, Esq.

(57) ABSTRACT

An object of the disclosed technology is to realize, at low cost, an optical communication module capable of high-speed operation and having an excellent EMC property.

A means for achieving the object is as follows. A main body of an optical module is formed of a ceramic multilayer structure, and a high-frequency line is provided. A surface of the main body is provided with an electrode pattern, which is electrically connected to a ground pin. A metal cap is secured to the electrode pattern using a conductive adhesive.

20 Claims, 20 Drawing Sheets

3-0

3-13

3-14

OPTICAL MODULE AND OPTICAL COMMUNICATION SYSTEM

BACKGROUND OF THE INVENTION

The present invention relates to an optical module that is useful for a communication system using an optical fiber. To be more specific, the present invention relates to an optical module that has an optical fiber, or an optical connector, for inputting or outputting a light signal, and a terminal for inputting or outputting an electric signal, and that has a light-emitting device or a detector inside the optical module. In particular, a package main body is formed of a ceramic plate multi-layer structure, and the present invention is useful for an optical nodule which is intended for ultrahigh-speed operation at 10 Gbit/s or more.

In recent years, the speed of optical communication systems is rapidly becoming faster, and prices thereof are also rapidly becoming lower. As a result, a faster optical module, a price of which is lower, is strongly demanded. As a package of the optical module, a plastic package, a metal package, a ceramic package, and the like, are being examined. However, an optical module intended for high-speed operation at 10 Gbit/s or more needs the connection of input and output terminals (leads) and a light-emitting element or a detector by incorporating a microwave line, a strip line, a microstrip line, a coplanar line, or the like, each impedance of which is matched, in this optical module in order to transfer an electric signal with low loss and low distortion. It is also necessary to connect a terminal or lead for inputting and outputting to a luminous element or a light-receiving element. Therefore, a high-speed optical module inevitably uses a ceramic package capable of including a built-in microwave line. The ceramic package is formed of a multilayer structure of ceramic, and is produced by a method called a green-sheet method. Using this method, an electrode pattern or a via hole can be formed arbitrarily on each layer, and thereby a high-frequency circuit, impedance of which is matched, can be provided on a package.

Usually, hermetic sealing of an optical module using a ceramic package can be achieved by using a metal cap. In addition, the metal cap is electrically connected to a terminal (pin) which is connected to a ground so that the cap functions as an electromagnetic shield. This reduces degradation in performance of the module caused by circumferential electromagnetic noise, and also reduces electromagnetic noise emitted from the module in reverse. In other words, the metal cap improves an EMC (electromagnetic compatibility) property of the optical module. In the optical module using the ceramic package, the first conventional method for securing a metal cap is welding; for example, the method is described in Japanese Patent Laid-open No. Hei 7-63957, Japanese Patent Laid-open No. 2000-164742, and the like. The welding ensures hermetic, and what is more, the welding can achieve excellent continuity with an electrode pattern provided on the package side. Connecting the electrode pattern to a ground pin permits the cap to function as an electromagnetic shield. The second conventional method is solder jointing: for example, the method is described in Japanese Patent Laid-open Nos. Hei 10-293230, Hei 10-170771, Hei 9-318849, and the like. The solder jointing can also ensure hermetic and continuity. Moreover, the third method is described in Japanese Patent Laid-open No. Hei 10-12808. In this method, a metal shield cap is secured to a multilayer ceramic substrate at low cost. This method relates to a RF power amplifier module used for mobile devices. According to the method, the metal cap is temporarily secured to the multilayer ceramic substrate by means of a mechanical structure; and when mounting the module to a mounting substrate by soldering, fusing solder and joining the cap to the substrate with the solder achieves continuity between the shield cap and a ground.

SUMMARY OF THE INVENTION

An object of the present invention is to provide an optical module which uses a ceramic package, and is characterized by the following: low cost; an optical part is not damaged; and the metal cap can be secured while conductivity is reliably provided. According to the present invention, it is possible to provide, at low cost, an optical module that operates at super-high speed of 10 Gbit/s class, and that has an excellent EMC property.

As a background of the present invention, the conventional methods have the following disadvantages:

If a cap is secured by the first welding method, it is necessary to provide, in advance, voluminous metal (a ring for welding), which melts by welding, on the ceramic package side. More specifically, in advance, by means of Ag brazing solder, or the like, a metal ring such as kovar should be secured to the electrode pattern which is provided on the surface of the ceramic package. Therefore, the cost of the welding method is extremely high, which is a disadvantage to be considered.

In addition, if the metal cap is secured by solder jointing which is the second method, heating at about 200° C. is required. This produces a problem of thermal resistance of an optical part and an adhesive. For example, in an optical module having a pigtail of an optical fiber, heating changes the quality and shape of a sheath (nylon, etc.) of the fiber. In the worst case, an imposed stress causes microbending in a core wire of the fiber, resulting in a large optical loss. An optical module on which an optical connector for inputting and outputting a light signal is mounted also uses an adhesive made of epoxy, etc. to secure a ferrule constituting a connector to a module. Therefore, it has the following disadvantages: if the optical module is heated at about 200° C., the adhesive degrades, leading to a decrease in bond strength; and fitting the connector into the optical module, and taking the connector out from the module, increase an optical loss of the connector.

Furthermore, the third method also has a disadvantage that implementing an optical module on a mounting substrate by a reflow device causes heat damage to optical components.

Basic thoughts of the present invention will be described below.

The present invention provides an optical module comprising at least: a module base; a lid member having conductivity for covering the module base, the module base and the lid member forming a space therebetween; at least a semiconductor optical element and an electric signal wiring portion disposed in the space; and an optical path member which leads from the space to the outside of the module base, wherein the module base is made of ceramic; at least a part of the module base has a conductive member; at least a part of the conductive member has a conductive adhesive; the module base and the lid member are bonded together by the conductive adhesive; a conductive function portion possessed by the lid member is electrically connected to the conductive member which is provided on at least a part of the module base; the conductive member is electrically connected to a terminal which is connected to a ground; and the conductive adhesive is an organic conductivity adhesive.

Referring to typical and more specific modes, the present invention will be described in detail hereinafter.

One mode is an optical module comprising: an optical fiber or an optical connector, which is used for inputting and outputting a light signal; a terminal for inputting and outputting an electric signal; a main body, namely, a module base; a lid member, namely, a cap; a semiconductor optical element or a semiconductor integrated circuit element in a space surrounded by the main body and the cap, wherein ceramic plates, each having a wiring pattern, are laminated to form the multilayerd main body. The main body is provided with a microstrip line for transmitting a high-speed electric signal, and a high-frequency circuit including a via hole, a terminating resistor, a wire bond, and the like; and the terminal is connected to the semiconductor optical element or the semiconductor integrated circuit element. An electrode pattern is provided on at least a part of a surface of the main body; and the electrode pattern is connected to the terminal which is connected to a ground. A conductive adhesive is applied to at least a part of the electrode pattern to bond the cap.

As the cap, a metal cap, or a cap having a conductive film on its surface, is used. As a base material of the cap, besides metal, for example, ceramic may also be used, and a conductive film may be formed on its surface. Electrically connecting the lid having conductivity to the terminal which is connected to a ground permits the lid to function as an electromagnetic shield. Thus, degradation in property of the module caused by circumferential electromagnetic noise can be prevented, and emission of electromagnetic noise from the module can also be prevented.

The conductive adhesive is an organic adhesive containing conductive filler and also containing thermosetting resin or thermoplastic resin; for example, it is a silver epoxy adhesive in which epoxy resin is mixed with a hardening agent and silver dust. A conductive adhesive is selected so that curing temperature of the conductive adhesive becomes at least 150° C. or less, or 130° C. or less if possible. In general, such a conductive adhesive is generally called a cold cure conductive adhesive.

The semiconductor optical element inside the package is protected with transparent resin. As protective coating, general resin used for protective coating suffices. A typical example of such a resin is silicon resin gel. The package is provided with a ventilation structure so that water in the package can go in and out easily. Examples of such a ventilation structure will be described later.

As a material of the metal cap, a material having an expansion coefficient which is close to that of the ceramic package is preferable; for example, kovar, FeNi alloy, and stainless steel are preferable. Plating may be applied to the surface of the metal cap; for example, plating including Au and Pd is performed. In addition, if a conductive film is used, ceramic, resin, or the like, is used for the main body of the cap. The cap has a bent portion to cover at least a part of a pair of sides of the main body. Fittable areas are formed at, at least the pair of the bent portions of the cap and a pair of sides of the main body, respectively, and both the fittable regions are fitted to each other, which is useful for securing the cap and the main body. To be more specific, the metal cap may also be subjected to bending or stamping; in particular, the metal cap may also be bent so as to cover the sides of the package partially. Moreover, in addition to the securing means by the conductive adhesive, other mechanical securing means may also be used in combination. In general, the plurality of fittable areas is provided on each of the sides of the cap and the main body.

The built-in semiconductor optical element includes a laser diode, a photodiode, and an avalanche photodiode, for example. The semiconductor integrated circuit includes a preamplifier IC.

DESCRIPTION OF THE PREFERRED EMBODIMENTS

Structure of an optical module according to the present invention, and main points of the production method thereof, will be described with reference to FIGS. 1, 2, and 3. This optical module is a typical example in which an optical element, and an optical detector for monitoring output of the optical element are used. A main body of an optical package is formed of ceramic lamination layers. A cap is bonded to the main body of this optical package using a conductive adhesive. In this example, an electric conductor cap is used for the ceramic package. Therefore, electromagnetic shielding sufficient for high-frequency operation can be achieved. In addition to it, the adhesion using the conductive adhesive enables production at low cost. It is to be noted that this example is used for describing the main points of the present invention and, as a matter of course, the present invention may have many modes as exemplified below.

Figure 1:
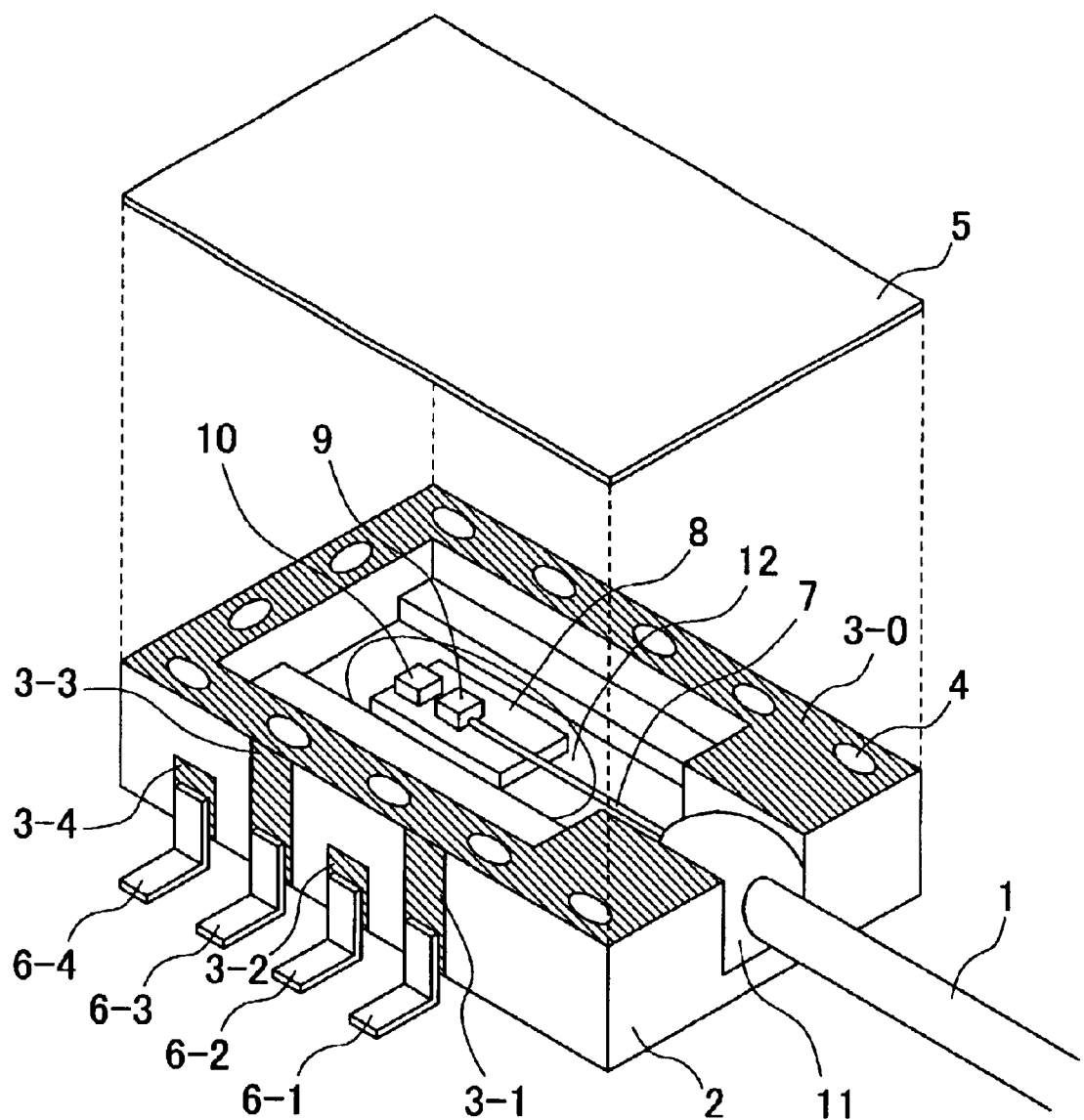
FIG. 1 is a perspective view of a LD module according to a first embodiment of the present invention.
Figure 3:
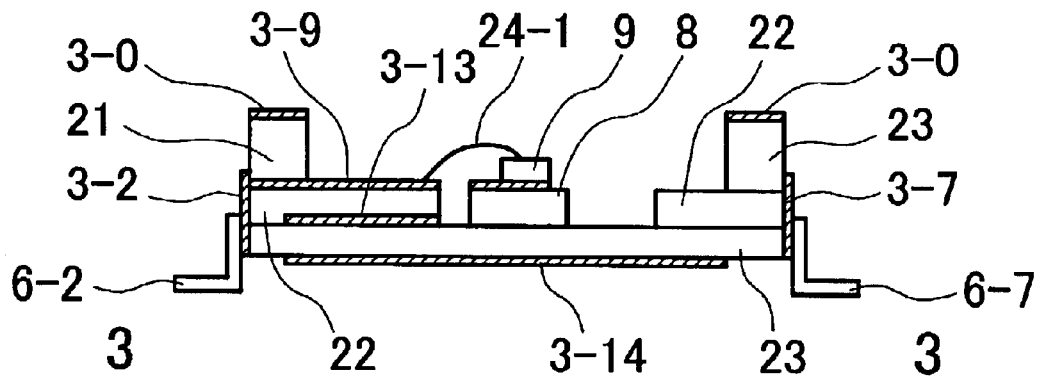
FIG. 3 is a cross section of the LD module taken along line 3—3 in FIG. 2.
Figure 4:
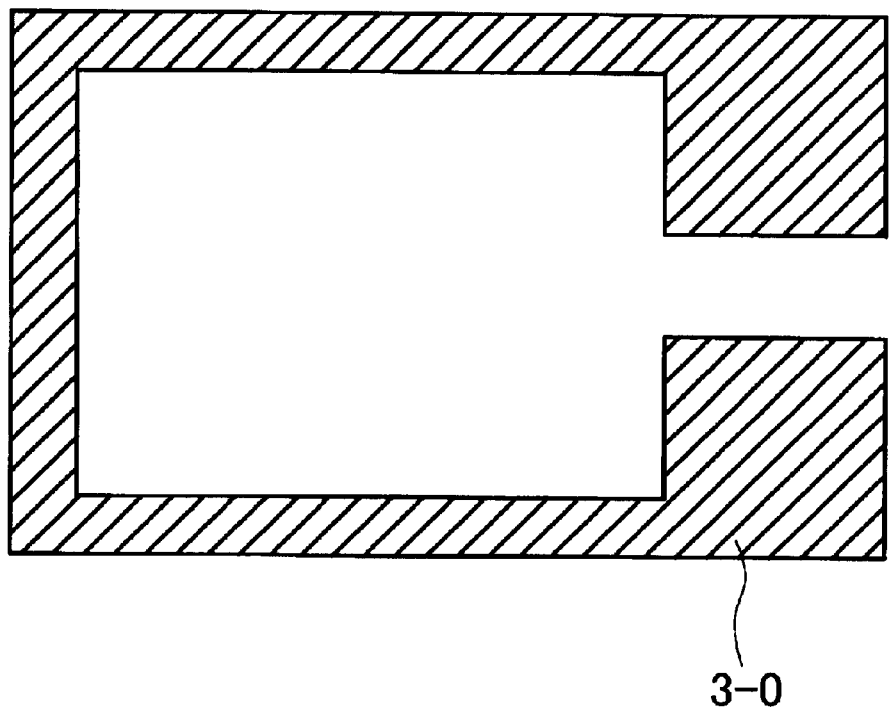
FIG. 4 is a diagram illustrating an electrode pattern provided on the top surface of a first layer of three ceramic plate layers which constitute a package main body of the LD module according to the first embodiment of the present invention.
Figure 5:
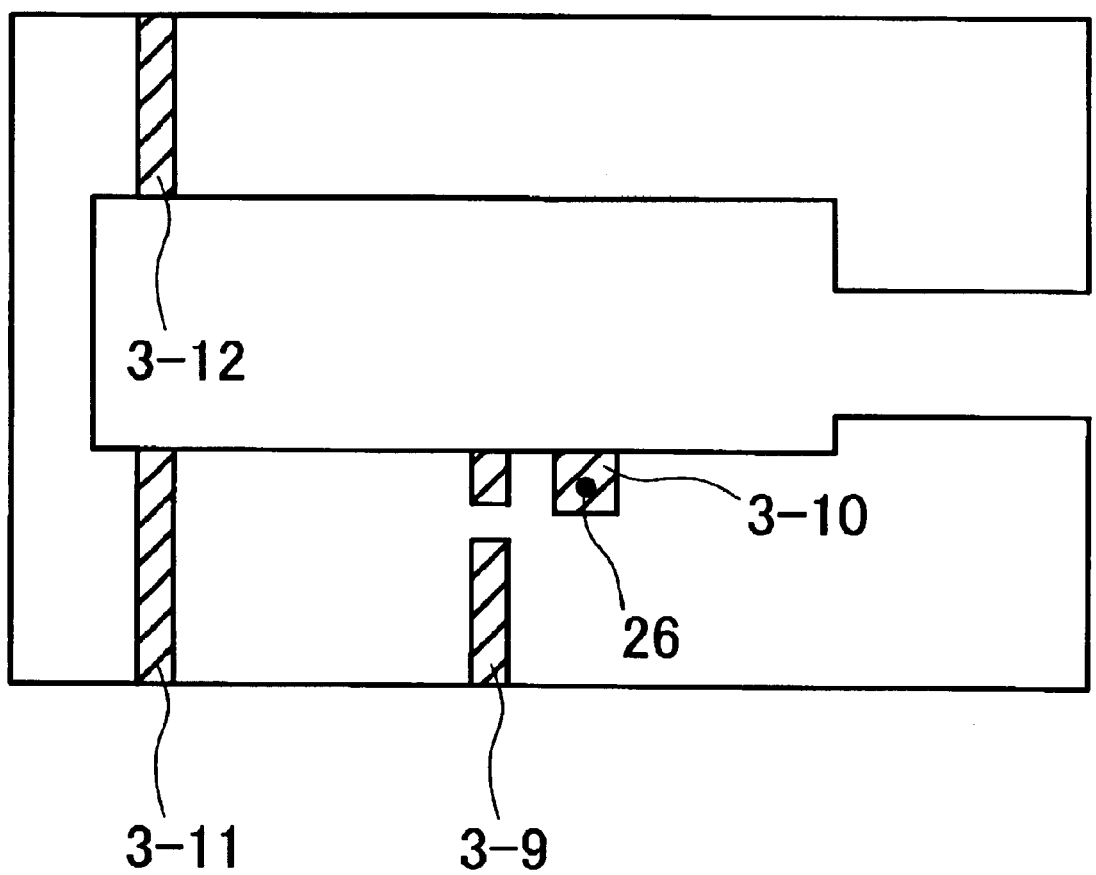
FIG. 5 is a diagram illustrating an electrode pattern provided on the top surface of a second layer of three ceramic plate layers which constitute the package main body of the LD module according to the first embodiment of the present invention.
Figure 6:
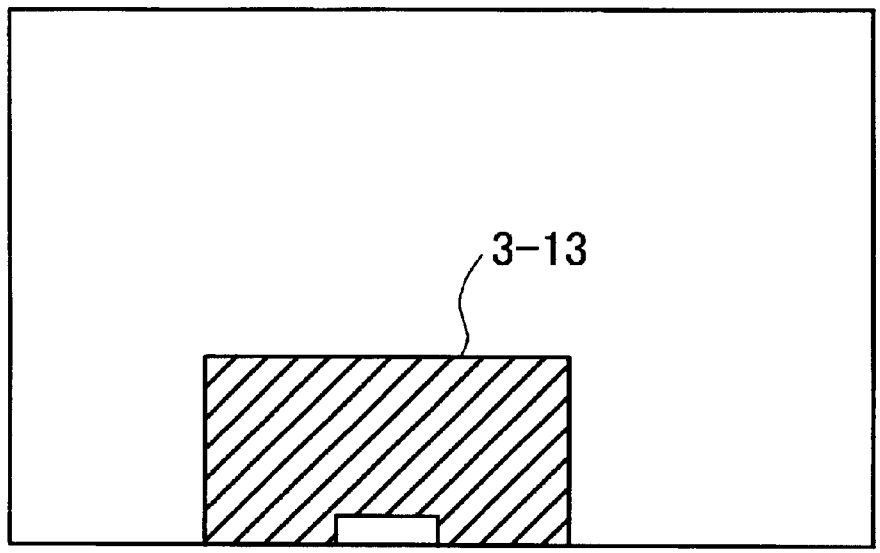
FIG. 6 is a diagram illustrating an electrode pattern provided on the top surface of a third layer of three ceramic plate layers which constitute the package main body of the LD module according to the first embodiment of the present invention.
Figure 7:
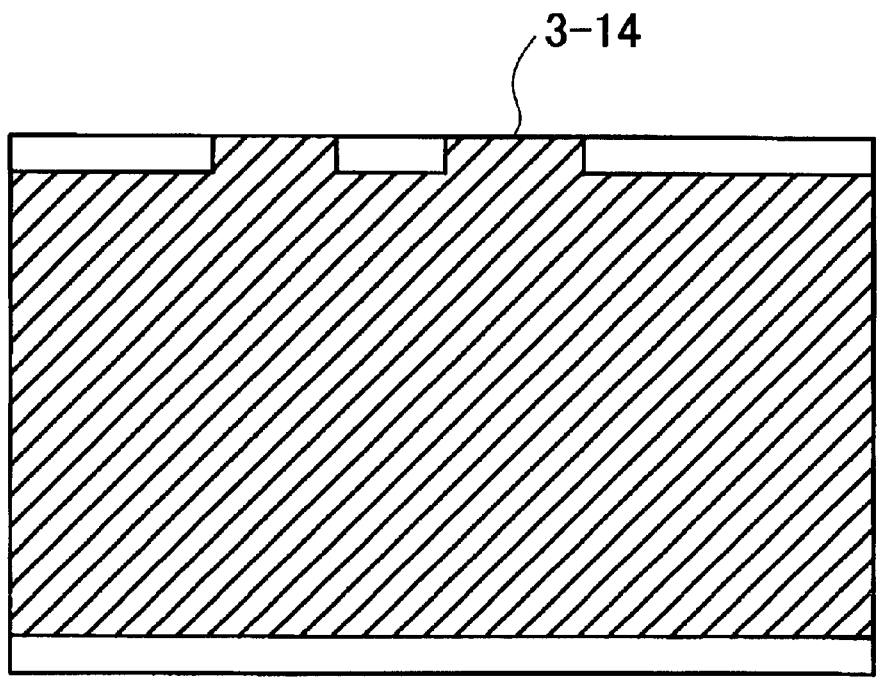
FIG. 7 is a diagram illustrating an electrode pattern provided on the under surface of the third layer of three ceramic plate layers which constitute the package main body of the LD module according to the first embodiment of the present invention.

FIG. 1 is a perspective view of a typical optical module according to the present invention. In order to describe the inside of the package, and a method of bonding a cap, a cap 5 is shifted to a position above the optical module for the sake of illustration. However, details on an internal electrode pattern, a wire bond, and the like, are omitted. FIG. 2 is a plan view illustrating a state before the cap of the optical module shown in FIG. 1 is mounted. In FIG. 2, the electrode patterns, the wire bonds, and the like, inside the package are also illustrated in detail. FIG. 3 is a cross section of the optical module taken along line 3—3 of FIG. 2. FIGS. 4 through 7 illustrate respective electrode patterns of three ceramic plate layers, which constitute the main body of this optical module. FIG. 4 illustrates an electrode pattern on the top of a first layer 21 of the ceramic lamination layer (that is to say, on the top of the package main body). FIG. 5 illustrates an electrode pattern on the top surface of a second layer 22. FIG. 6 illustrates an electrode pattern on the top surface of a third layer 23. FIG. 7 illustrates an electrode pattern on the back side of a third layer (that is to say, on the under surface of the package main body).

As shown in FIG. 1, this module is a LD module comprising a laser diode (LD) element 9 for generating a light signal, and a photodiode (PD) element 10 for monitoring its optical output, both of which are incorporated in the package. This module is housed in a DIL (Dual-In-Line) package. To be more specific, the DIL package comprises a fiber pigtail 1 for outputting a light signal, and eight leads 6-1 through 6-8 for inputting and outputting an electric signal. In this connection, in FIG. 1, because the leads 6-5 through 6-8 exist on the opposite side, they are not illustrated. It is apparent if FIG. 2 is taken into consideration.

A package main body 2 is of a ceramic laminated structure in which electrode patterns and a via hole are formed on each ceramic plates 21, 22, 23 made of alumina and the ceramic plates 21, 22, 23 are laminated to one another. The package main body 2 comprises a microstrip line 3-9, a via hole 26, and a terminating resistor 25. FIG. 3 is a cross section of this ceramic laminated structure (21, 22, 23). The structure permits a high-speed driving signal inputted from the lead pin 6-2 to be transmitted to the LD element 9 with low distortion. Accordingly, a light signal having an excellent waveform can be obtained. Electrode patterns can also be formed on the top surface, under surface, and sides of the package. Forming a conductor pattern (this pattern is denoted at reference numeral 3-14 in FIG. 7) on the under surface of the package, and connecting this conductor pattern to ground pins 6-1, 6-3, permit the under surface of the package to operate as an electromagnetic shield.

The LD element 9 is placed with a high degree of positional accuracy on a silicon sub-mount 8 having highly accurate V-groove structure. In addition, securing a core wire 7 of a fiber on this V structure enables highly accurate positioning between the LD element and the fiber. As a result, optical output sufficient for practical use can be obtained from an edge of the fiber. Moreover, the LD element 9 and the PD element 10 are protected with transparent resin 12 such as silicon gel. It is to be noted that the V-groove structure in the above-mentioned silicon substrate is a V-shaped groove formed on the basis of etching anisotropy of silicon crystal, which is a well-known technique in the field of semiconductor. Because this V groove is broadly used for securing an optical component, detailed description will be omitted.

A covering material of an optical fiber 1 is secured to the package main body 2 using an adhesive 11. An electrode pattern 3-0 is provided on the top surface of the main body 2 as shown in FIG. 1. This electrode pattern 3-0 is connected to ground pins 6-1 and 6-3 through side patterns 3-1 and 3-3. The metal cap 5 is fixedly bonded to the electrode pattern 3-0 on the top of the package with the conductive adhesive 4 which is applied to many points on the electrode pattern 3-0.

A manufacturing process for the optical module will be outlined below. A DIL type ceramic package having the electrode patterns 3-0 to 3-14, the via hole 26, the terminating resistor 25, and the lead pins 6-1 to 6-8 is produced by the green-sheet method. On the other hand, the LD element 9 and the PD element 10 are placed on the silicon sub-mount 8 having the V groove and electrode mentioned above.

The silicon sub-mount 8 on which the optical elements are placed is secured to the package main body 2. The LD element and the PD element are connected to the electrode patterns of the package using wire bonds 24-1 to 24-4. The optical fiber 1 from which a sheath at the tip is removed is prepared. Then, the core wire part 7 at the tip is secured to the V groove of the silicon sub-mount 8 using an adhesive. Incidentally, illustration of the adhesive is omitted. In addition, the optical fiber is secured to the package main body 2 using the adhesive 11. The LD element 9 and the PD element 10 are protected with the transparent resin 12. Finally, the conductive adhesive 4 is applied to the electrode pattern 3-0 and the metal cap 5 is bonded to the electrode pattern 3-0.

As the conductive adhesive used in the present invention, the conductive adhesive, adhesion temperature of which is comparatively low, is preferable. This is because substantial thermal damage to an optical component such as a covering material of an optical fiber, an adhesive for fixing an optical component, or the like, can be prevented.

A representative example of such a conductive adhesive includes an organic conductive adhesive which contains metal powder (what is called, filler metal) for achieving conductivity, and thermosetting resin or thermoplastic resin used as binder. The so-called silver epoxy adhesive, in which a hardening agent and silver dust are mixed with epoxy resin, is most generally used. Curing temperature of a silver epoxy adhesive is usually 150° C. or less. As compared with general soldering, it is possible to reduce working temperature by 50° C. or more. Moreover, in recent years, a cold cure silver epoxy adhesive which hardens even by heating at a temperature of 120° C. for about 30 minutes has been developed. This cold cure silver epoxy adhesive has reliability sufficient for practical use. In the present invention, using this adhesive as a conductive adhesive permits heating temperature at the time of adhesion to be reduced further. By using the conductive adhesives for securing the metal cap, a temperature at which the cap is secured can be set at a temperature lower than a heat-resistant temperature of the adhesive used for securing a sheath of the fiber and an optical part; and thereby it is possible to fixedly bond the metal cap without causing heat damage to the sheath and the adhesive. In addition, specific resistance of silver epoxy is $1\times10^{-4}$ Ωcm or less. Contact resistance of 0.2Ω or less can also be selected. Thus, the present method makes it possible to ensure excellent continuity between the metal cap 5 and the electrode pattern 3, and to use the cap 5 as an excellent electromagnetic shield, whereby the optical module according to the present invention can have an excellent EMC property (electromagnetic compatibility).

It is to be noted that although the silver epoxy adhesive is in particular described as a conductive adhesive here, instead of epoxy resin, a conductive adhesive containing other thermosetting resin and thermoplastic resin, such as acrylic resin and polyamide resin, can also be used in a like manner. Moreover, in order to achieve conductivity in particular, the conductive adhesive using silver dust is described here. However, a conductive adhesive containing other kinds of conductive powder, such as Sn, Cu, Ni, and carbon, can also be used in a like manner.

Now, if the cap is secured using the conductive adhesive, not a little water and air permeate through the conductive adhesive, which is disadvantageous to hermetic inside the package. Therefore, there is a possibility that water and oxygen degrade properties of a semiconductor optical element such as the LD element and the PD element. As described above, this problem can be solved by sealing the semiconductor optical element by transparent resin, which can provide reliability sufficient for practical use. The reason why the transparent resin is used here is because it prevents light from being absorbed. As the transparent resin, gel silicon resin, for example, can be used. In addition, ensuring reliability by sealing the element using resin inside the package in this manner eliminates the need for sealing the package for achieving hermetic. Even at the positions where an optical fiber and an optical connector cross the package, it is not necessary to achieve hermetic. Thus, further low cost of the optical module can be realized.

On the other hand, if a package structure that is spuriously sealed using a conductive adhesive or an adhesive is produced, water penetrates through the conductive adhesive and enters the package after a long period of time. As a result, the following problems arise: the water that has entered evaporates rapidly when soldering a lead, which causes a phreatic explosion; a drop in temperature causes dew condensation in the package; and the like. Therefore, if resin sealing of the LD element and the PD element ensures reliability, it is preferable that the package is provided with a ventilation structure so that water in the package can go in and out easily. As a method for providing ventilation structure, there are the following methods:

(1) A conductive paste is applied to only a part between the cap and the main body so as to provide an area to which the conductive paste is not applied.

(2) A clearance is provided between the cap and the module main body, or between the cap and the optical fiber (or between the cap and the adhesive that secures the optical fiber).

(3) The cap or the module are formed with a hole and a groove.

If a material having an expansion coefficient which is close to that of a ceramic package is selected as a material of the metal cap, heat stress applied to a bonded part can be reduced more efficiently, which leads to improvement in reliability of the bonded part. An expansion coefficient of alumina ceramic is normally about $7\times10^{-6}/°$ C. As metal having an expansion coefficient close to this value, kovar, FeNi alloy, stainless steel, etc., can be named. In addition, the quality of a junction interface made by a conductive adhesive may change by water and oxygen permeating through the adhesive, which leads to degradation in continuity and mechanical strength. Accordingly, it is preferable to plate the metal cap so that the quality does not change. As the plating, Au plating, Ag plating, Pd plating, Sn plating, PbSn plating, Cu plating, etc., the base of which is Ni, etc., can be listed. However, higher reliability can be realized by plating that uses Au or Pd, the quality of which does not change easily, as a surface layer. Although in particular the case where a metal plate is used for the cap was described above, a similar electromagnetic shield effect can be obtained even if ceramic or resin is used for the main body of the cap to form a conductive film.

In the present invention, when securing the cap using silver paste, the following problems arise: a position of the cap shifts during baking; and the applied conductive adhesive flows out, resulting in a bad outward appearance. As measures to overcome the problems, in the case of the metal cap, bending an edge of the cap can prevent a position of the cap from shifting, and can also prevent the bad outward appearance caused by the adhesive flowing out. Moreover, bending the cap further to cover the side of the package can achieve a higher electromagnetic shield effect. Additionally, bending the metal cap still further so that the metal cap extends around the back side of the package permits the cap to be mechanically secured to the package with higher reliability. In this connection, if the cap is bent, the use of a conductive adhesive between the electrode pattern and the metal cap, which are provided on the side, or the back, of the package, produces an electromagnetic shield effect even if an electrode pattern is not provided on the top surface of the package.

The present invention can be applied to not only a LD module but also all optical modules that have at least a semiconductor optical element and a semiconductor integrated circuit inside its module, and that has an optical fiber or an optical connector; such optical modules include a PD module into which a PD and a preamplifier integrated circuit (IC) are built, and an avalanche photodiode (APD) module into which an avalanche photodiode and a preamplifier IC are built. Therefore, similar effects can be obtained from the application. Embodiments of the present invention will be specifically described one by one below.

<First Embodiment>

A first embodiment concerns an optical module having an LD element and a PD element that monitors output of the LD element.

FIG. 1 is a perspective view of a LD module with a fiber pigtail according to the first embodiment of the present invention. In order to describe the inside of the LD module, and a method for bonding a cap, a cap 5 is shifted to a position above the LD module for the sake of illustration. Here, a part of details on an internal electrode pattern, a wire bond, and the like, are omitted. FIG. 2 is a plan view illustrating a state before the cap of the LD module shown in FIG. 1 is mounted. In FIG. 2, the electrode patterns, the wire bonds, and the like, inside the module are also illustrated in detail. FIG. 3 is a cross section of the LD module taking along line 3—3 in FIG. 2. A main body of the ceramic package is formed of three ceramic lamination layers. FIGS. 4 to 7 illustrate respective electrode patterns of three ceramic plate layers, which constitute the main body of the ceramic package. FIG. 4 illustrates an electrode pattern on the top surface of a first layer 21 (that is to say, on the top surface of a package main body). FIG. 5 illustrates an electrode pattern on the top surface of a second layer 22. FIG. 6 illustrates an electrode pattern on the top surface of a third layer 23. FIG. 7 illustrates an electrode pattern on the back side of a third layer 23 (that is to say, on the under surface of the package main body).

As shown in FIG. 1, this module is a LD module having a LD element 9 and a monitor PD element 10 which monitors optical output of the LD element 9. Leads 6-1 and 6-3 are leads connected to a ground when using this module. A ground electrode pattern 3-13 is connected to the leads 6-1, 6-3 through electrode patterns 3-1, 3-3 on the side of the package.

A lead 6-2 supplies a driving signal to this module. The driving signal passes through a side electrode pattern 3-2 a microstrip line 3-9, a terminating resistor 25 provided on the line, and a wire bond 24-1 before the driving signal is supplied to the LD element 9. In addition, the other electrode of this LD element 9 is connected to a ground layer 3-13 through a wire bond 24-2, an electrode pattern 3-10, and a through hole 26. The ground layer 3-13 is formed on the top surface of a ceramic plate 23 (refer to FIG. 3). Impedance of the microstrip line 3-9 can be set at a given value (usually 50 or 25Ω is used as the impedance) by setting a width of the microstrip line 3-9 and a thickness of a substrate of the second layer 22. Moreover, setting the impedance so that the sum of a resistance value of the LD element and a resistance value of the terminating resistor becomes substantially equal to the impedance permits reflection of the driving signal from the LD element to be minimized, whereby a light signal with little distortion can be obtained.

Figure 2:
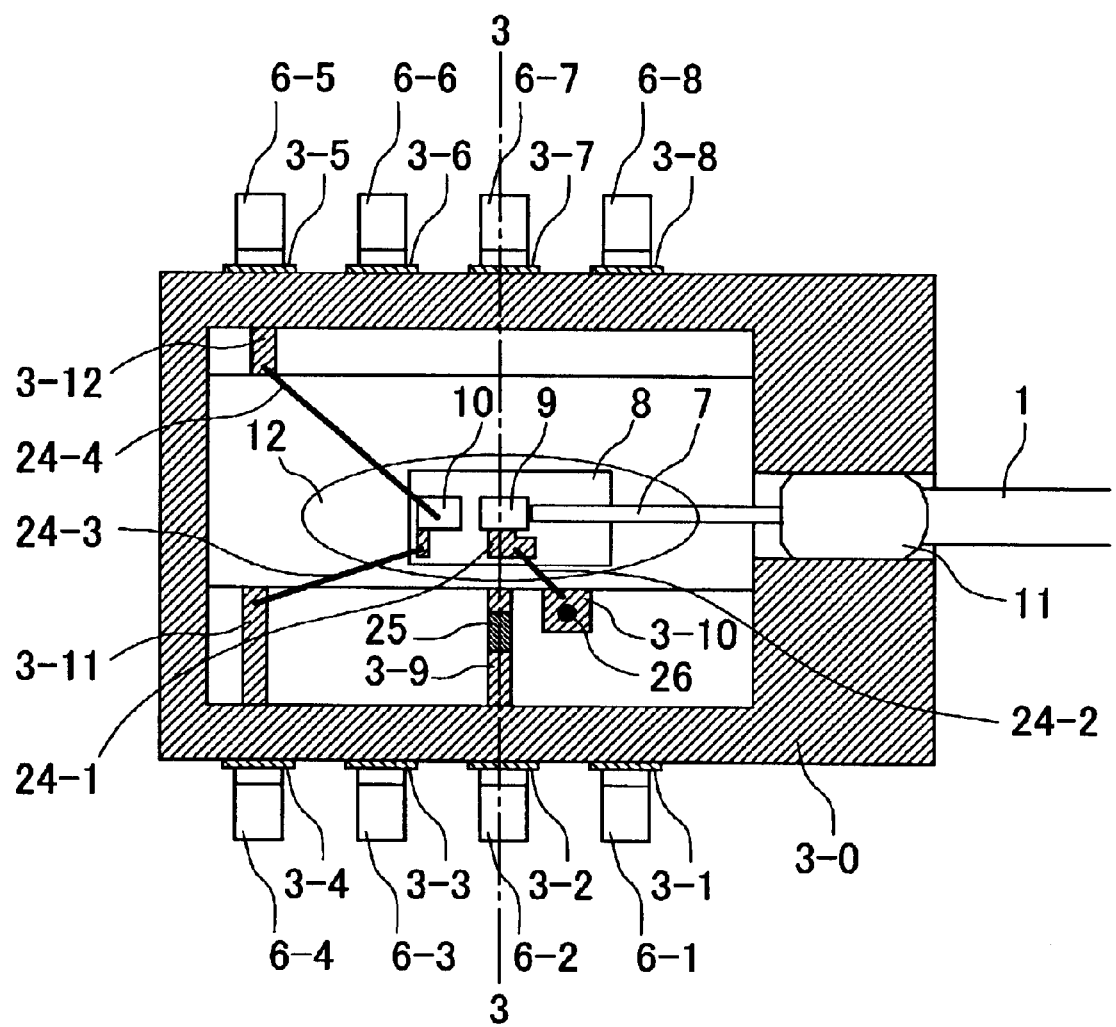
FIG. 2 is a plan view of the LD module according to the first embodiment of the present invention, with a cap omitted.

As illustrated in the plan view of FIG. 2, photocurrent generated in the monitor PD element is output across leads 6-4 and 6-5 through wire bonds 24-3, 24-4, electrode patterns 3-11, 3-12, and side electrode patterns 3-4, 3-5. Measuring the photocurrent enables monitoring of optical output of this module.

In addition, the metal cap 5 of this package is bonded to the electrode pattern 3-0, which is provided on the top surface of the package, using the conductive adhesive 4; and the electrode pattern 3-0 is connected to leads 6-1, 6-3, which are connected to a ground, through electrode patterns 3-1, 3-3 provided on the side. Accordingly, the metal cap 5 can ensure excellent continuity with the ground, and thereby acts as an excellent electromagnetic shield. Further, the electrode pattern 3-14 on the under surface of the package is also connected to the ground pins 6-1, 6-3 through the side patterns 3-1, 3-3, and thereby acts as an excellent electromagnetic shield.

A manufacturing process of this LD module will be described below. In the first place, a ceramic package is produced. As illustrated in the cross section of FIG. 3, the main body 2 of the ceramic package has a multilayer structure formed of three layers of alumina ceramic plates 21, 22, 23. Such a layered structure is produced by the green-sheet method. To be more specific, slurry, in which organic binder and sintering adjuvant are added to alumina powder, is enlarged to form a raw ceramic sheet (green sheet); and the ceramic sheet is punched with a die into a given shape, while making the via hole 26. Next, conductor paste of W and Mo is screen-printed to make electrode patterns 3-0, 3-9 to 3-14, shown in FIGS. 4 to 7, on the respective surfaces of substrates. Three layers are laminated before sintering, and are then cut into individual packages by means of dicing. Conductive paste is applied to the sides of the package to make conductive patterns 3-1 to 3-8, to which the leads 6-1 through 6-8 are secured by means of Ag brazing solder. Finally, Ni/Au electrolytic plating as finishing is applied to exposed electrode patterns.

On the other hand, using AuSn solder, the LD element 9 and the PD element 10 are secured to a silicon sub-mount 8 having an electrode, on which a V groove for positioning a fiber and an element are provided. As illustrated in FIG. 1, using die bonding paste, the silicon sub-mount 8 is secured to the ceramic package main body on which the terminating resistor 25 is placed. In addition, wire bonds 24-1 to 24-4 each using a gold wire is provided to connect the LD element and the PD element to the electrode pattern of the module (refer to FIG. 2). A sheath at the tip of the optical fiber 1 having a protection sheath (jacket) made of nylon, etc. is removed to expose the core wire 7 inside the optical fiber 1. Then, using an epoxy UV adhesive (not shown), the core wire 7 is secured to the V groove provided on the silicon sub-mount 8.

On the other hand, the fiber 1 is secured to the module main body 2 using a thermosetting epoxy adhesive 11. A curing condition at this time is about 130° C. for 10 minutes. Potting, and baking, of transparent gel silicon resin are performed on the LD element 9, the PD element 10, and the silicon sub-mount 8 to provide protective coating 12. The conductive adhesive 4 is applied to many points of the metal pattern 3-0, which is provided on the top surface of the module, using a dispenser. In this case, cold cure silver epoxy in which silver dust is mixed with 1 liquid epoxy resin is used as the conductive adhesive. The module is covered with the metal cap 5 which has been made by NiAu plating on a FeNi alloy plate (t=0.1 mm). Then, the metal cap 5 is cured at 120° C. for 30 minutes to secure the metal cap 5.

Electrical resistance between the metal cap 5 and the ground leads 6-1, 6-3 becomes 0.1Ω or less after the metal cap 5 is secured, which ensures excellent conductivity. Thus, this module has an excellent EMC property. In addition, since curing temperature of the conductive adhesive is sufficiently as low as 120° C., the quality of the sheath of the fiber 1 does not change when the cap is secured, and the adhesive used for securing the fiber does not degrade. Accordingly, an excellent optical output property can be obtained. Moreover, even if a heat cycle test (from −40 to 85° C., 500 times) or a high-temperature high-humidity test (85° C., 85%, 2000 hours) are performed, there is no such problem that the metal cap 5 is removed from the main body 2. Additionally, resistance between the metal cap 5 and the ground leads 6-1, 6-3 does not increase. Further, since both of the LD 9 and the PD 10 are protected by the resin 12, even if the package itself does not have a hermetic structure, excellent reliability can be achieved. Furthermore, since the conductive adhesive is applied to only a part of the top surface of the package main body in this module, there is a clearance between the cap 5 and the main body 2, which acts as a ventilation structure. In addition to it, there is also a clearance between the cap 5 and the adhesive 11 for securing the fiber. This also acts as a ventilation structure. Accordingly, even if a lead is soldered after this optical module absorbs moisture in a high humidity condition, a phreatic explosion does not occur, which provides an excellent property.

<Second Embodiment>

A second embodiment is an optical module having a PD element and an IC element which amplifies output of the PD element.

Figure 8:
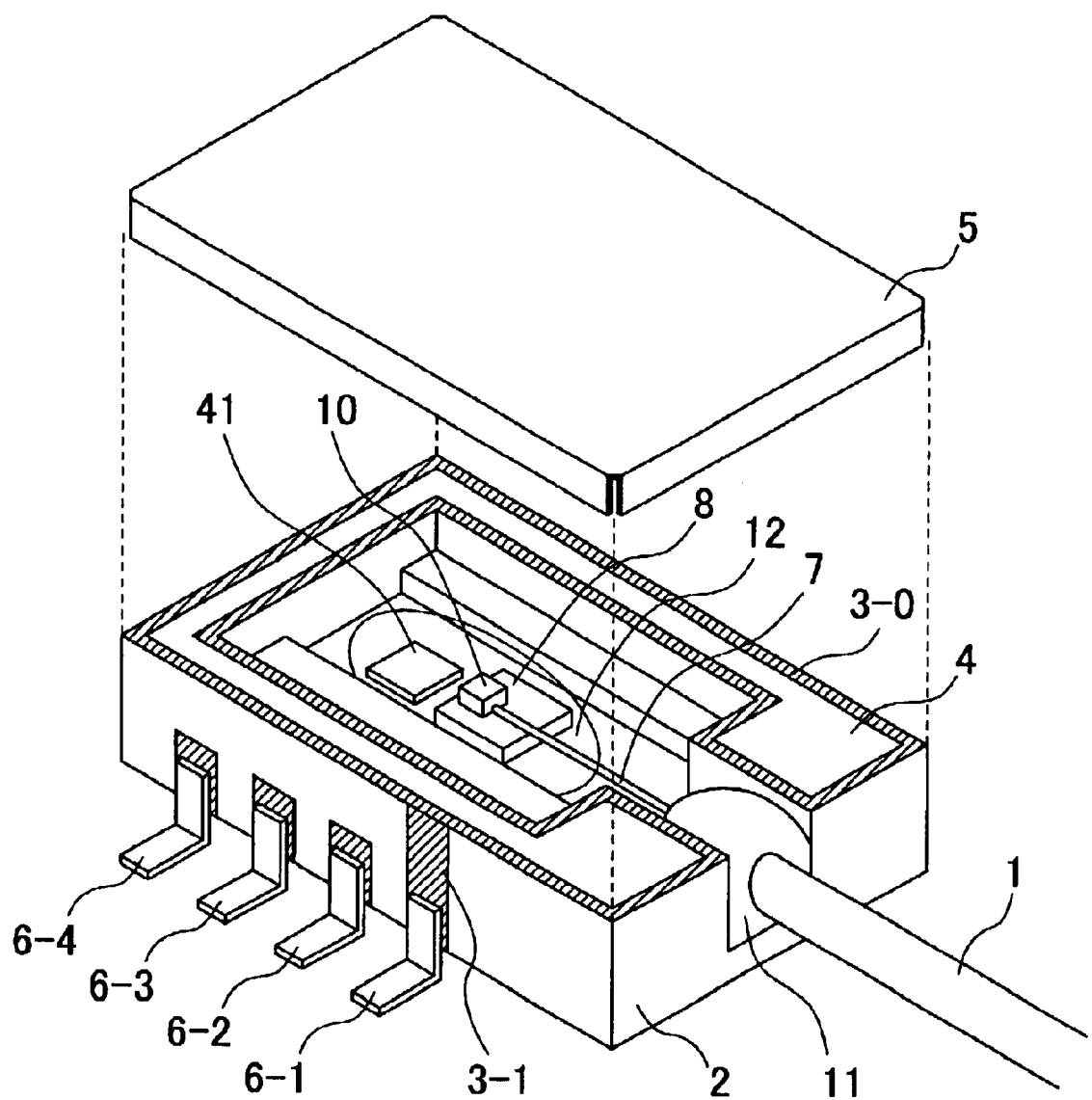
FIG. 8 is a perspective view of a PD module according to a second embodiment of the present invention.
Figure 9:
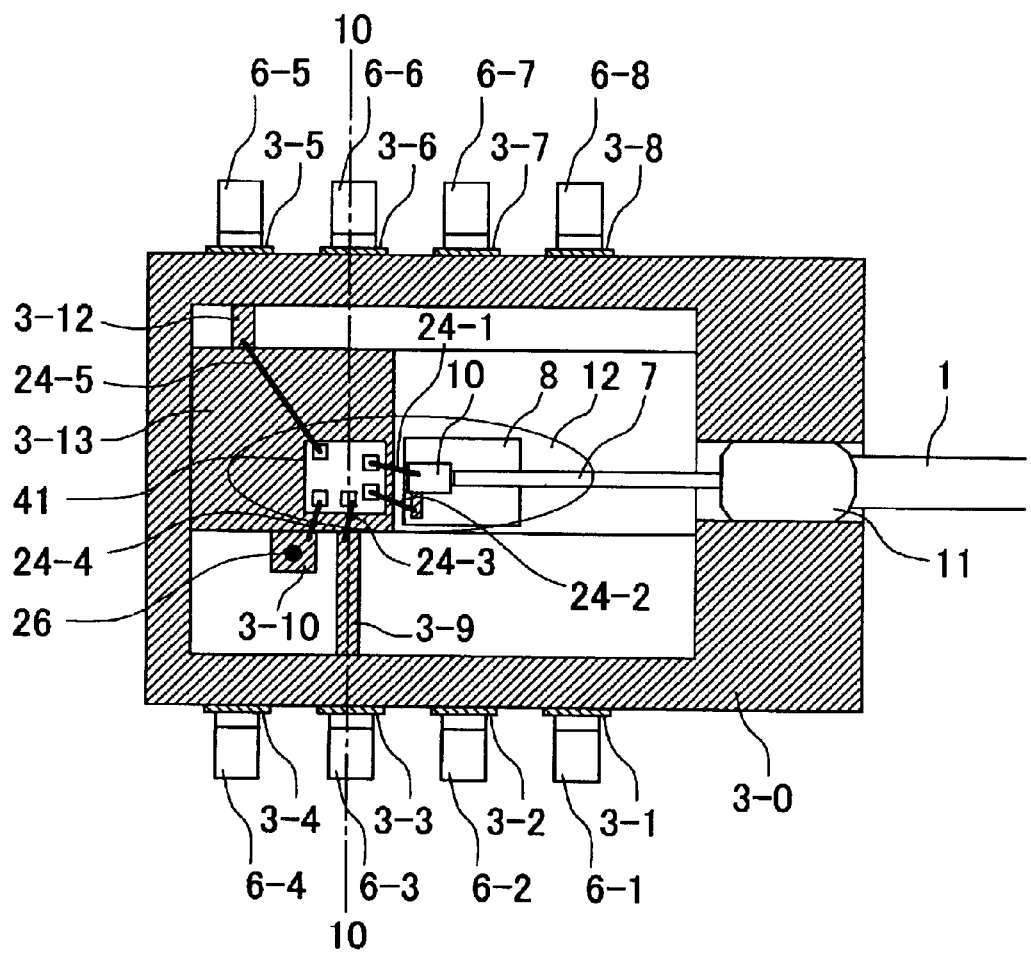
FIG. 9 is a plan view of the PD module according to the second embodiment of the present invention, with a cap omitted.
Figure 10:
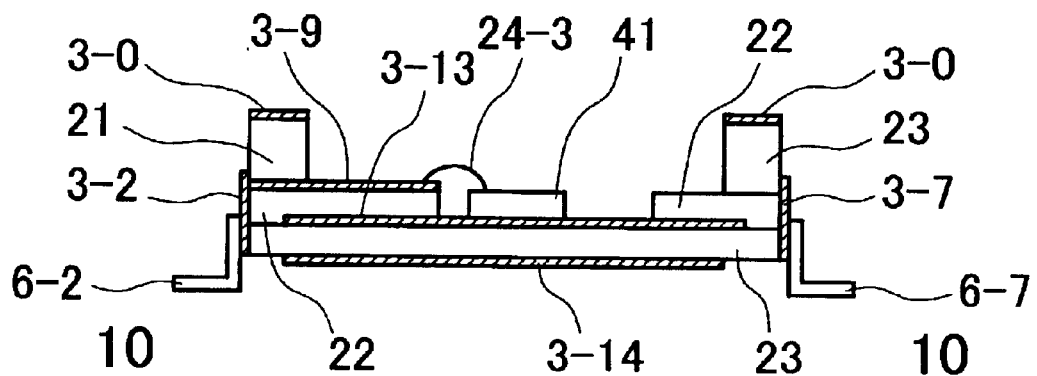
FIG. 10 is a cross section of the PD module taken along line 10—10 in FIG. 9.
Figure 11:
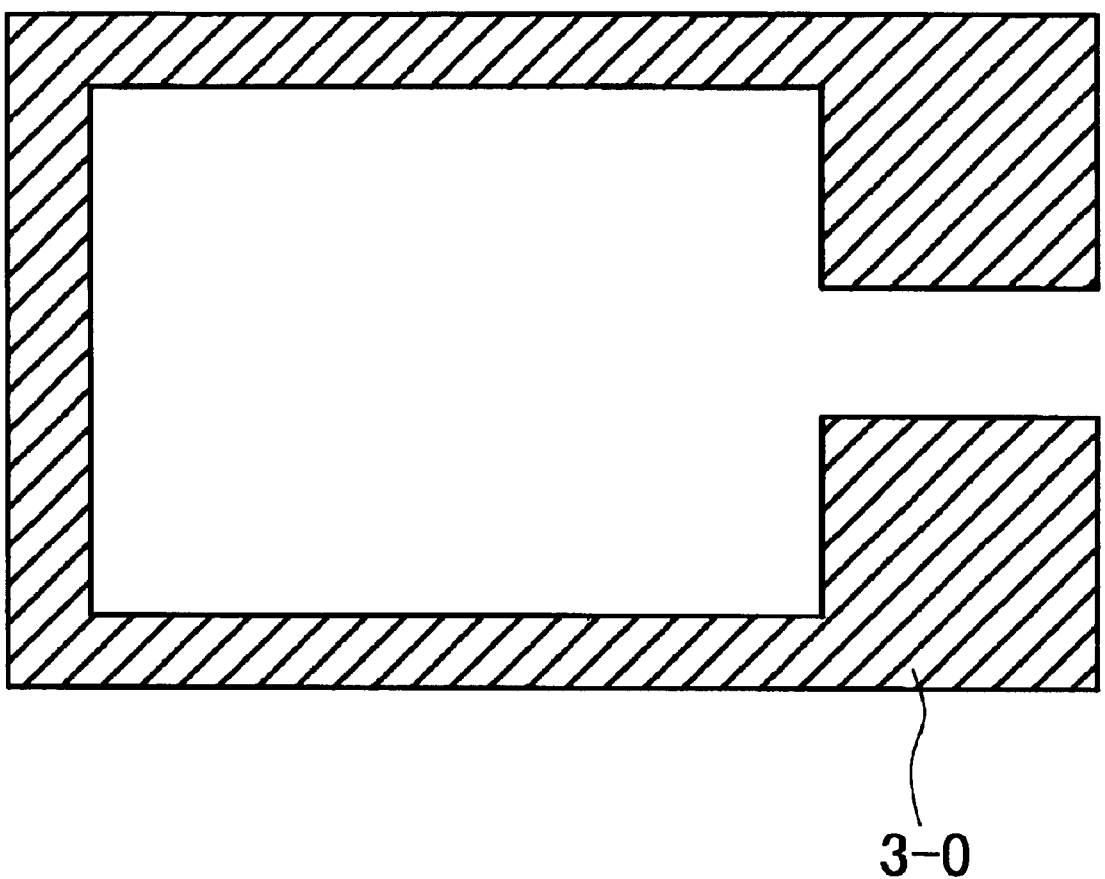
FIG. 11 is a diagram illustrating an electrode pattern provided on the top surface of a first layer of three ceramic plate layers which constitute a package main body of the LD module according to the second embodiment of the present invention.
Figure 12:
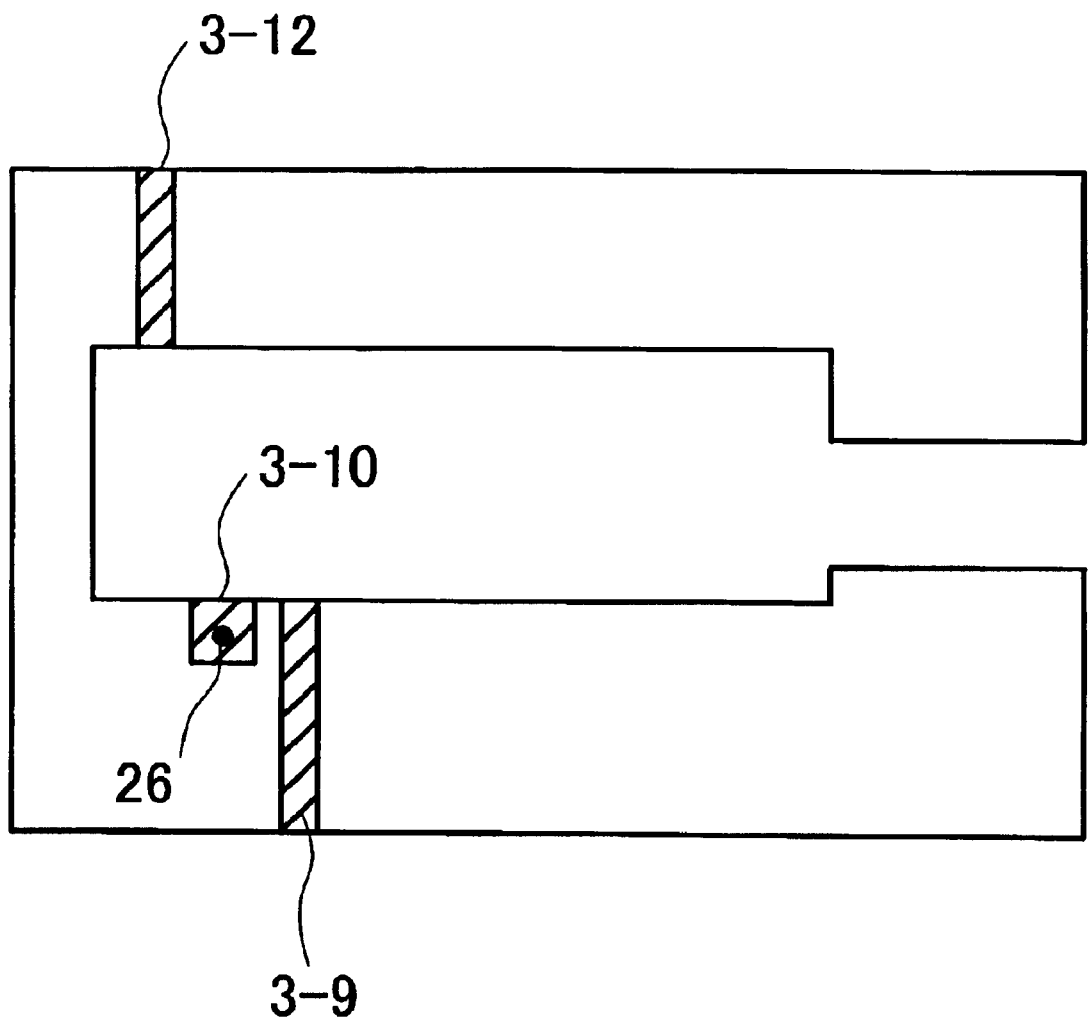
FIG. 12 is a diagram illustrating an electrode pattern provided on the top surface of a second layer of three ceramic plate layers which constitute the package main body of the LD module according to the second embodiment of the present invention.
Figure 13:
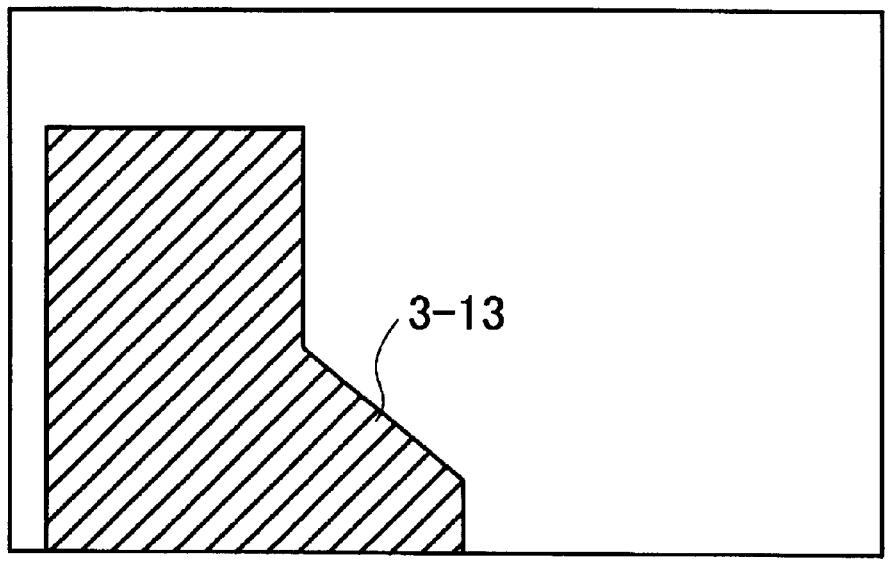
FIG. 13 is a diagram illustrating an electrode pattern provided on the top surface of a third layer of three ceramic plate layers which constitute the package main body of the LD module according to the second embodiment of the present invention.
Figure 14:
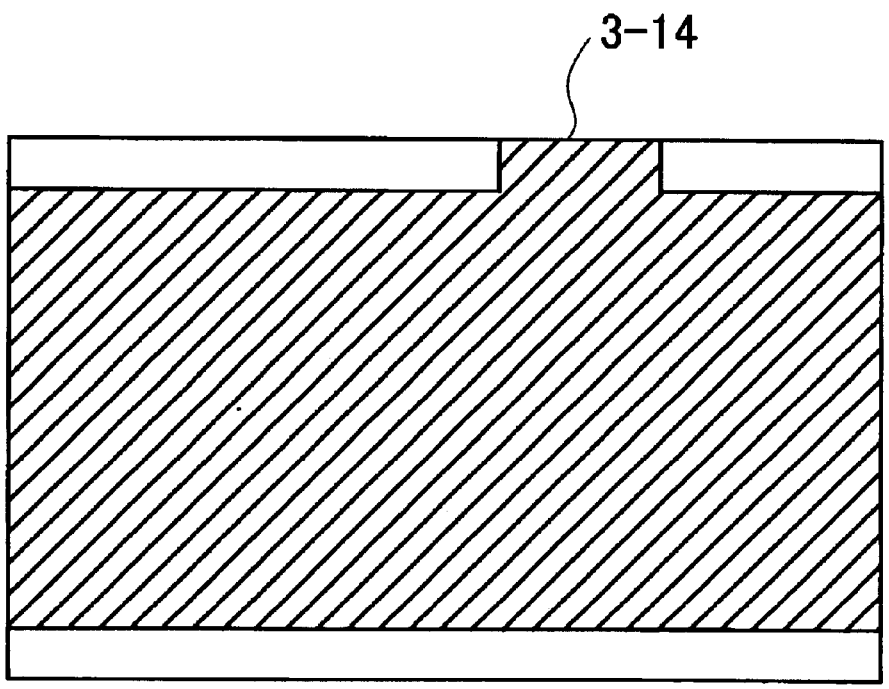
FIG. 14 is a diagram illustrating an electrode pattern provided on the under surface of the third layer of three ceramic plate layers which constitute the package main body of the LD module according to the second embodiment of the present invention.

FIG. 8 is a perspective view of a PD module with a fiber pigtail according to the second embodiment of the present invention. In order to describe the inside of the PD module, and a method for bonding a cap, the cap 5 is shifted to a position above the PD module for the sake of illustration. Here, a part of details on an electrode pattern, wire bonds, and the like, inside the package are omitted. FIG. 9 is a plan view of the PD module in FIG. 8, illustrating a state before the cap of the PD module is mounted. In FIG. 9, the electrode pattern, the wire bonds, and the like, inside the package are also illustrated in detail. FIG. 10 is a cross section of the PD module taken along line 10—10. in FIG. 9. FIGS. 11 to 14 illustrate respective electrode patterns of three ceramic plate layers, which constitute a ceramic package main body 4 of the PD module. FIG. 11 illustrates an electrode pattern on the top surface of the first layer 21 (that is, on the top surface of the package main body). FIG. 12 illustrates an electrode pattern on the top surface of the second layer 22. FIG. 13 illustrates an electrode pattern on the top surface of the third layer 23. FIG. 14 illustrates an electrode pattern on the back side of the third layer 23 (that is, on the under surface of the package main body).

As shown in FIG. 9, a light signal that enters the PD module from the optical fiber 1 is converted into an electric signal by the PD element 10. Then, the obtained electric signal is inputted into a preamplifier integrated circuit (IC) 41 through wire bonds 24-1, 24-2. The signal is amplified by this preamplifier IC 41, and is then output to a lead 6-3 through a wire bond 24-3, a strip line 3-9, and a side electrode pattern 3-3. Leads 6-2, 6-4 are terminals connected to a ground. These leads are connected to a ground pad of the IC 41 through side patterns 3-2, 3-4, a ground pattern 3-13, a via hole 26, an electrode pattern 3-10, and a wire bond 24-4. Electric current for driving the IC 41 is supplied from the lead 6-5 to a power supply pad of the IC through a side electrode pattern 3-5, the electrode pattern 3-12, and a wire bond 24-5.

Impedance of a microstrip line 3-9 can be set at a given value (normally, 50Ω) by setting a width of the microstrip line 3-9 and a thickness of a ceramic substrate of the second layer. Therefore, the electric signal amplified by the IC 41 can be output to the lead pin 6-3 with low loss and low distortion. In addition, the metal cap 5 is bonded to an electrode pattern 3-0, which is provided on the top surface of the package, using the conductive adhesive 4; and the electrode pattern 3-0 is connected to the lead 6-1, which is connected to the ground, through the electrode pattern 3-1 provided on the side of the package main body. Accordingly, when using this module, the metal cap 5 can ensure excellent continuity with the ground, and thereby the metal cap 5 acts as an excellent electromagnetic shield. Moreover, since the electrode pattern 3-14 on the under surface of the package is also connected to the ground pin 6-1, it acts as an excellent electromagnetic shield.

This PD module is produced by the following steps. In the first place, a ceramic package is produced. A main body 4 of the ceramic package has a multilayer structure formed of three layers of alumina ceramic plates 21, 22, 23. The main body 4 can be produced by the same method as that of the first embodiment.

On the other hand, using AuSn solder, the PD element 10 is secured to a silicon sub-mount 8 having an electrode, on which a V groove for positioning a fiber 7 and the PD element 10 are mounted. The silicon sub-mount 8 and the preamplifier IC 41 are secured to the package main body using die bonding paste. Additionally, the PD element is connected to an input pad of the preamplifier IC by the wire bonds 24-1, 24-2 each made of a gold wire. Likewise, an output pad, a ground pad, a power supply pad, of the preamplifier IC are connected to the electrode patterns 3-9 to 3-11 provided in the module by way of the wire bonds 24-3 to 24-5, respectively. A sheath at the tip of the fiber 1 having a nylon protection sheath (jacket) is removed to expose the core wire 7 inside the fiber 1. Then, using an acrylic UV adhesive (not illustrated), the core wire 7 is secured to the V groove provided on the silicon sub-mount 8. On the other hand, the fiber 1 is secured to the module main body 2 using a thermosetting epoxy adhesive 11. A curing condition at this time is about 130° C. for 30 minutes. Potting and baking of transparent silicon resin are applied to the PD element 10 and the preamplifier IC 41 to make a protective film 12 for them. The conductive adhesive 4 is applied to the metal pattern 3-0 provided on the top surface of the module by screen printing. In this case, as the conductive adhesive 4, cold cure type 2 liquid epoxy resin with which silver filler is mixed is used. On the other hand, a kovar plate (t=0.1 mm) is subjected to stamping and then Pd plating so as to produce the metal cap 5. The metal cap 5 is placed on the package main body 2. After that, the metal cap 5 is cured at 120° C. for 30 minutes to secure the metal cap 5 to the package main body 2.

Electrical resistance between the cap 5 and the ground lead 6-1 becomes 0.1Ω or less after the cap 5 is secured, which ensures excellent conductivity. Thus, this PD module has an excellent EMC property. In addition, because curing temperature of the conductive adhesive is sufficiently as low as 120° C., the quality of the nylon sheath of the fiber 1 does not change, and the adhesive used for securing the fiber does not degrade. Accordingly, the PD module having an excellent property can be obtained. Moreover, even if a heat cycle test (from −40 to 85° C., 500 times) or a high-temperature and high-humidity test (85° C., 85%, 2000 hours) are performed, the metal cap is not removed from the main body. Additionally, resistance between the metal cap and the ground lead does not increase. Moreover, since the PD element 10 and the preamplifier IC 41 are protected with the resin 12, excellent reliability can be achieved even in high-temperature and high-humidity conditions. Further, this module has a clearance between the metal cap 2 and the adhesive 11 for securing the fiber, the clearance works as a ventilation structure. Therefore, even if a lead is soldered after the module absorbs moisture in a high humidity condition, a phreatic explosion does not occur. Furthermore, since a rim of this cap is bent as showing in FIG. 8, even if the conductive adhesive runs over from between the cap and the top surface of the main body to some extent, the conductive adhesive is covered by the cap, which does not produce a problem of outward appearance. In addition to it, since the cap does not move when it is secured, easier fixation of the cap can be performed.

<Third Embodiment>

A third embodiment is an optical module having the following: a LD element; a PD element that monitors output of the LD element; and an optical connector. Therefore, unlike the first and second embodiments, the present embodiment additionally includes an optical connector mechanism.

Figure 15:
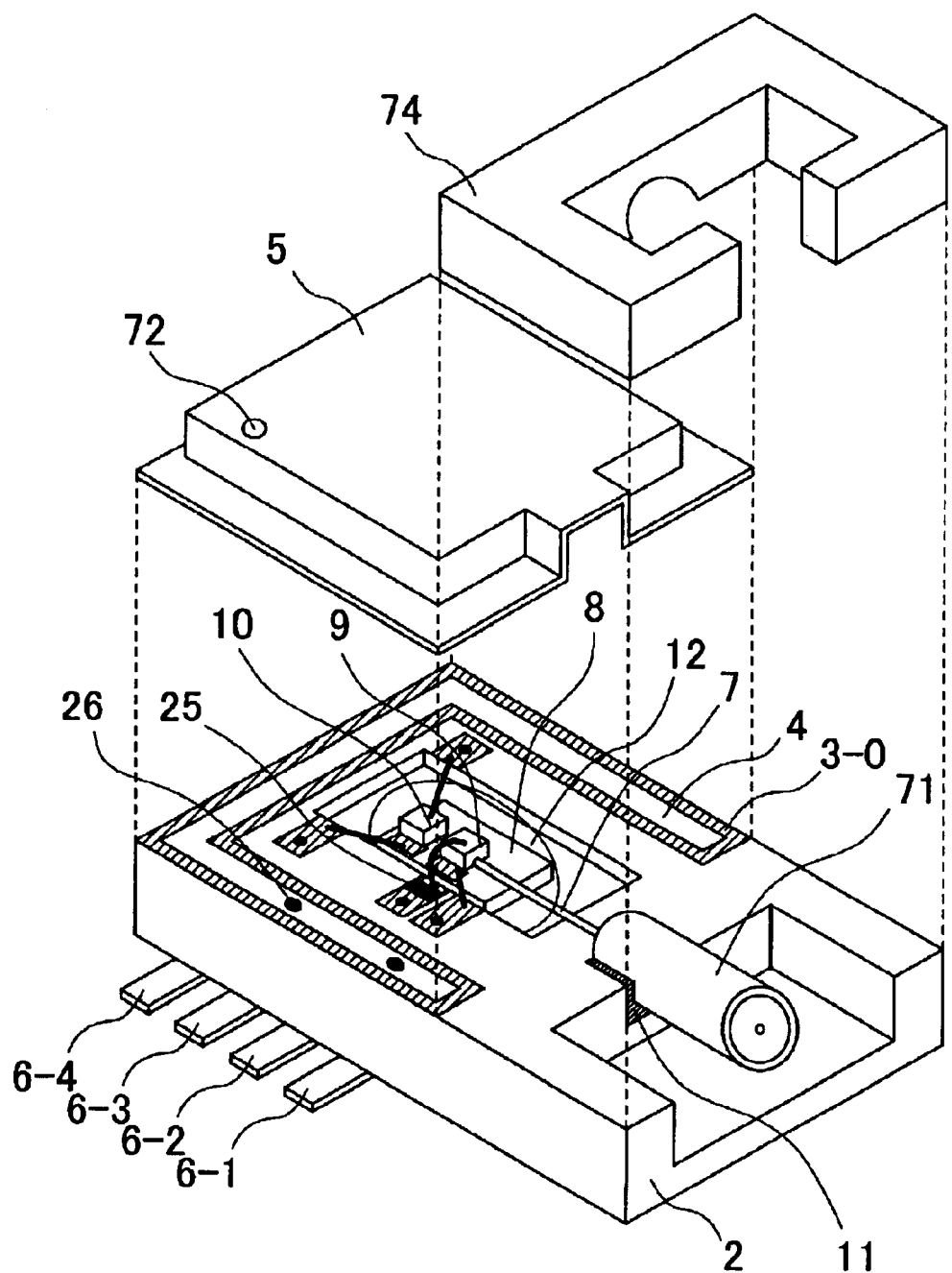
FIG. 15 is a perspective view of a LD module according to a third embodiment of the present invention.

FIG. 15 is a perspective view of a LD module with an optical connector according to the third embodiment of the present invention. In order to describe the inside of the module, and a method for bonding a cap 5, the cap 5 and a connector fixing bracket 74 are shifted to a position above the module for the sake of illustration. Here, although this module has the same function as that of the LD module of the first embodiment, it has, for example, the following differences:

(1) An optical output interface is an optical connector, and has a connector mechanism.

(2) Leads are taken out from the bottom of a package.

In order to realize an optical connector mechanism, a ferrule 71 having a short bare fiber 7 is fixedly bonded to a package main body. In addition, although wiring and connections are similar to those in the first embodiment, those are different from the first embodiment in that each electrode pattern is connected to a lead at the bottom of the package through a via hole. Moreover, this embodiment is similar to the first embodiment in that a microstrip line and a terminating resistor are used for a signal line in order to transmit a LD driving signal to the LD element with low loss and low distortion. Furthermore, the metal cap 5 is electrically connected to ground pins 6-1, 6-2 through a conductive adhesive 4, an electrode pattern 3-0, and a through hole 26.

This LD module is produced by the following steps. To begin with, as is the case with the first embodiment, a ceramic package having a bottom lead is prepared by the green-sheet method. The LD element 9 and the PD element 10 for monitoring optical output are mounted on a silicon sub-mount 8 having a V groove, an electrode, and the like. The silicon sub-mount 8 is secured to the main body 2 using die bonding paste. As is the case with the first embodiment, electrodes of the LD element and the PD element are connected to an electrode pattern of the package by wire bonds each using a gold wire. Zirconia ferrule 71 (1.25 mm in diameter), an end face of which is polished, and which has a fiber core wire 7, is prepared. Using an epoxy UV adhesive (not shown), the core wire 7 is secured to the V groove provided on the silicon sub-mount 8. Then, using the epoxy thermosetting adhesive 11, the ferrule 71 is secured to the main body 2. Moreover, a connector-fixing block 74 made of metal is bonded to the main body using an epoxy thermosetting adhesive (not shown) and thereby the ferrule 71 is completely secured. Potting and baking of silicon resin are applied to the LD element 9, the PD element 10, and the sub-mount 8 to provide a protective film 12 for them. The conductive adhesive 4 is applied to the metal pattern 3-0 by a dispenser. In this case, as the conductive adhesive, cold cure type 1 liquid epoxy resin with which silver filler and tin alloy filler are mixed is used. On the other hand, the metal cap 5 is produced by the following steps: making a ventilation hole 72 in a FeNi alloy plate (t=0.1 mm); forming a three-dimensional structure of the plate by pressing; and applying Ag—Pd plating to the plate. Then, the main body 2 is covered with the thus produced cap 5. After that, the cap 5 is cured at 120° C. for 30 minutes to thereby secure the cap 5 to the main body 2.

Electrical resistance between the cap 5 and the ground leads 6-1, 6-3 becomes 0.1Ω or less after the cap 5 is secured, which ensures excellent conductivity. Thus, an excellent EMC property can be expected for this LD module. In addition, since curing temperature of the conductive adhesive is sufficiently as low as 120° C., the adhesive 11 used for securing the ferrule, and the adhesive (not illustrated) used for bonding the ferrule 71 and the fiber core wire 6, do not degrade when securing the cap. Therefore, even if a fiber with a connector is repeatedly mounted to and removed from a connector of this module, an optical loss of the connector does not increase, leading to excellent reliability. Moreover, since the metal cap of this module has the ventilation structure 72, even if a lead is soldered after the module absorbs moisture in a high humidity condition, a phreatic explosion does not occur, which does not cause degradation in property.

<Fourth Embodiment>

A fourth embodiment is characterized by a devised shape of a cap.

Figure 16:
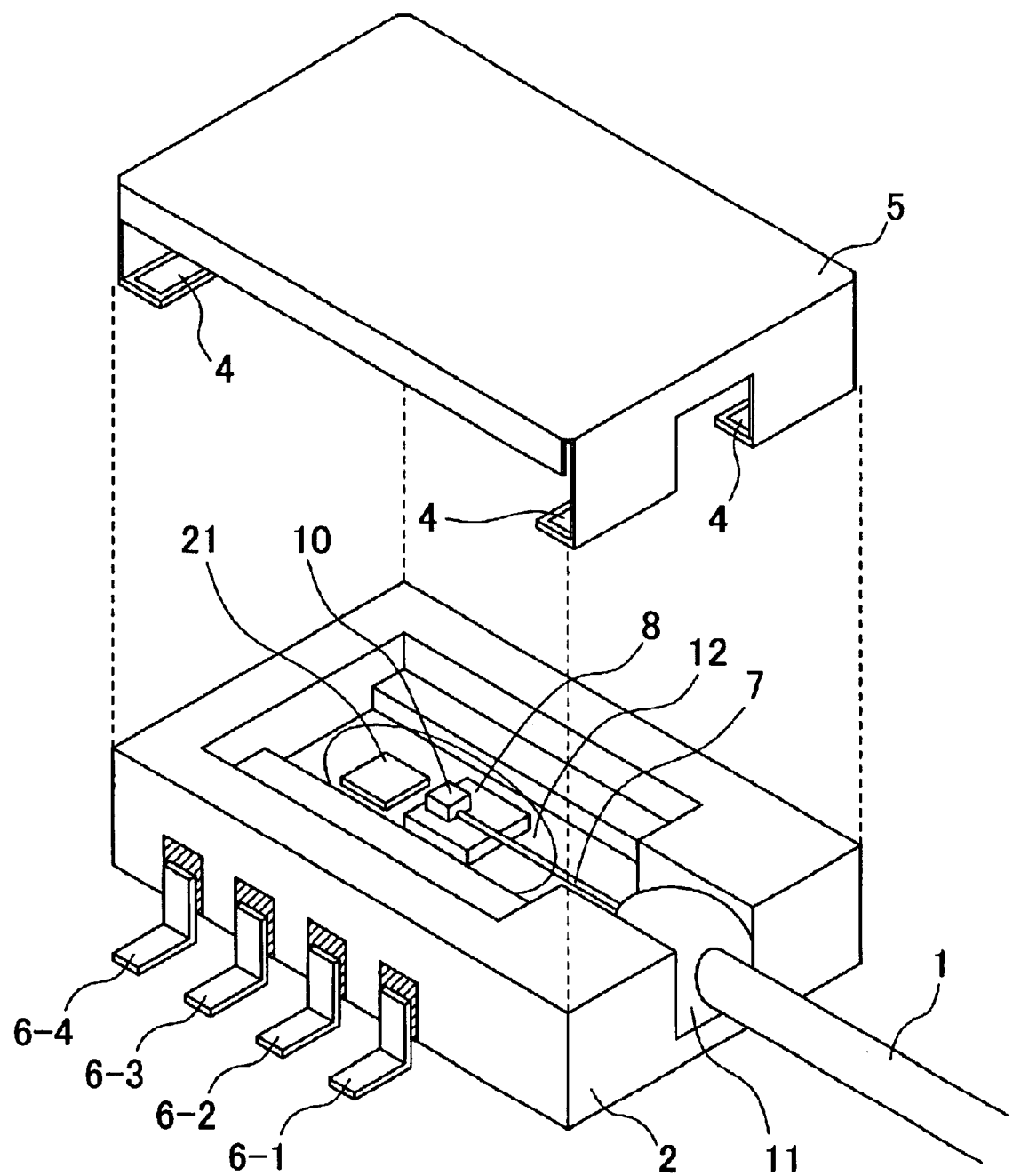
FIG. 16 is a perspective view of a PD module according to a fourth embodiment of the present invention.

FIG. 16 is a perspective view of a PD module with a fiber pigtail according to the fourth embodiment of the present invention. In order to describe the inside of the module and a method for securing a metal cap 5, the metal cap 5 is shifted to a position above the module for the sake of illustration. In a state in which the present invention is actually embodied, the cap 5 is secured to an electrode pattern on the bottom of a main body 2 using a conductive adhesive 4.

Although this PD module has the same function as the PD module shown in the second embodiment, this module is different from that of the second embodiment in the following points:

(1) The metal cap is bent in such a manner as to extend to a part of the back of the main body.

(2) There is not the electrode pattern 3-0 on the top surface of the package as shown in FIG. 8. The metal cap 5 is electrically connected to a ground pin 6-1 through a conductive adhesive 4, the electrode pattern 3-14 (having, the same shape as that in FIG. 14) provided on the under surface of the package.

Incidentally, other configurations will not be detailed. In the figure, like reference numerals denote like or corresponding parts.

This PD module is produced by the following steps. In the first place, using a method similar to that of the second embodiment, a sub-mount 8 on which a PD element 10 is placed and a preamplifier IC 21 are secured to a package main body 2. Then, given wire bonding is performed. Next, an optical fiber 1 is secured to a package substrate. After that, a protective film 12 is provided so as to cover an optical element 10, etc.

On the other hand, a stainless steel plate is subjected to bending, and then Pd—Ag plating is applied to the stainless steel plate to produce the metal cap 5. The conductive adhesive 4 which uses thermoplastic resin is applied to a bent portion of the produced metal cap 5 before pre-baking at 140° C. for 5 minutes. Next, the cap is fit into the module main body, and is then heated and melt at 150° C. for five minutes while exerting pressure on the bent portion on the bottom to bond the cap to the main body. The thermoplastic conductive adhesive used here is made of polyamide resin which is mixed with silver filler. Since a ground pattern is formed over the whole back of the module, electrical resistance between the cap 5 and the ground lead 6-1 becomes 0.1Ω or less, which ensures excellent conductivity. In addition, because the curing condition of the conductive adhesive is 150° C. for 5 minutes, which means low temperature and a short time. What is more, since only the bottom of the module can be heated using a hot plate, the quality of a fiber sheath does not change, and the adhesive used for securing the fiber does not degrade. Accordingly, an excellent light receiving property can be obtained.

Moreover, this module has a clearance between the metal cap 5 and the main body, the clearance works as a ventilation structure. Therefore, even if a lead is soldered after the module absorbs moisture in a high humidity condition, a phreatic explosion does not occur. Additionally, the cap is bent, and the cap is mechanically secured to the main body. Therefore, when this module is mounted to a mounting substrate by soldering, even if the thermoplastic conductive adhesive is softened, the cap does not drop off. Thus, excellent continuity can be obtained even after soldering. Moreover, the cap is bent to cover the side of the module, whereby a higher EMC property can be obtained.

<Fifth Embodiment>

A fifth embodiment is characterized by a method for securing a metal cap.

Figure 17:
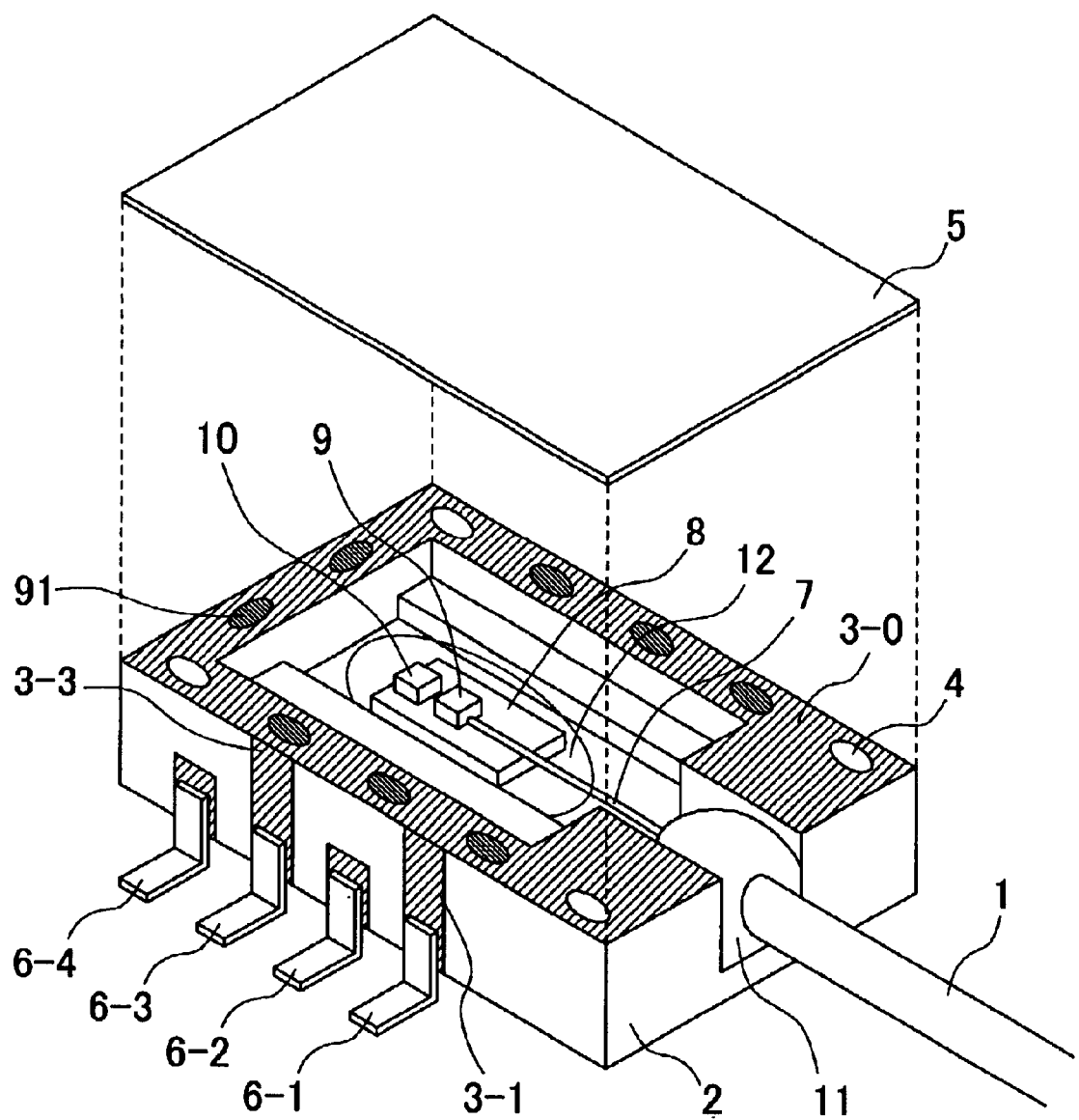
FIG. 17 is a perspective view of a LD module according to a fifth embodiment of the present invention.

FIG. 17 is a perspective view of a LD module with a fiber pigtail according to the fifth embodiment of the present invention. In order to describe the inside of the module and a method for securing the cap 5 to a module 2, the cap 5 is shifted to a position above the module 2 for the sake of illustration.

This LD module can basically be embodied by a method similar to that of the first embodiment. However, a method for securing the metal cap is different from that of the first embodiment. In this connection, other configurations will not be detailed. In the figure, the same reference numerals denote the same or corresponding parts. In this embodiment, as an adhesive for securing the cap 5, both of the conductive adhesive 4 having conductivity and a usual adhesive 91 which does not have conductivity are used.

As the conductive adhesive, for example, a conductive adhesive in which thermosetting epoxy adhesive is mixed with silver filler can be used. In addition, as the usual adhesive without conductivity, for example, a thermosetting epoxy adhesive can be used. After each of them are applied to the electrode pattern 3 at many points using a dispenser, the module 2 is covered with the metal cap 5. Then, baking at 120° C. is performed for 30 minutes to secure the metal cap 5 to the module 2. This increases bond strength, and at the same time the use of the conductive adhesive, the cost of which is high, is minimized. Thus, costs can be reduced. Also in this embodiment, since excellent continuity between ground leads 6-1, 6-3 and the cap 5 can be achieved through the conductive adhesive 4, the metal cap 5 works effectively as an electromagnetic shield. Therefore, this LD module has an excellent EMC property.

<Sixth Embodiment>

A sixth embodiment is characterized in that a ceramic substrate is used for a cap.

Figure 18:
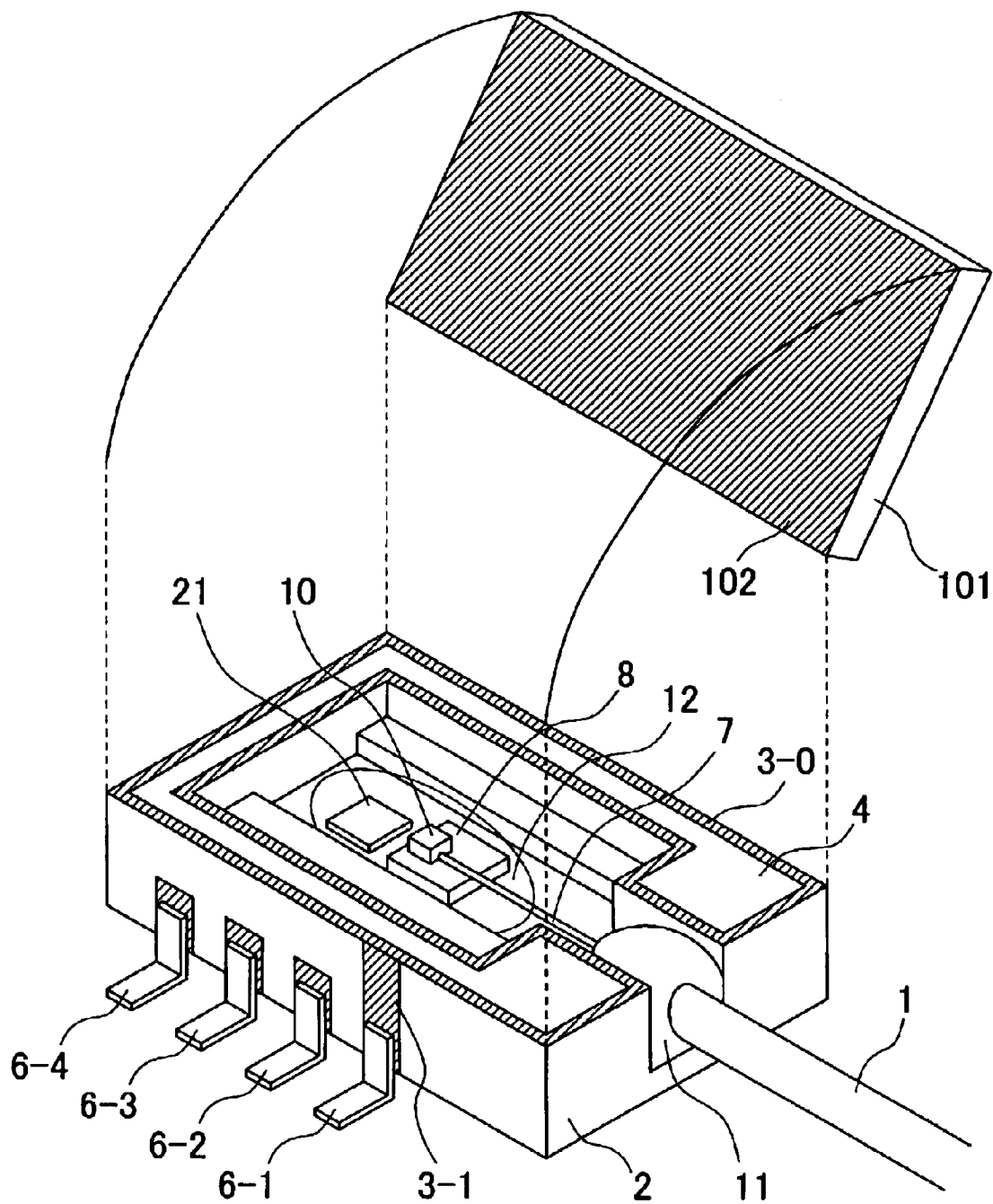
FIG. 18 is a perspective view of a PD module according to a sixth embodiment of the present invention.

FIG. 18 is a perspective view of a PD module with a fiber pigtail according to the sixth embodiment of the present invention. In order to describe the inside of the module, a method for securing a cap, and the back of the cap, the cap 5 is shifted to a position above, and is also rotated, for the sake of illustration. In a state in which the present invention is actually embodied, the cap 5 is bonded to the main body 2 by a conductive adhesive 4.

This PD module has a structure basically similar to that of the second embodiment, and is embodied by a similar method. However, a structure of the cap is different from that of the second embodiment. Therefore, other configurations will not be detailed. In the figure, like reference numerals denote like or corresponding parts.

In this embodiment, a ceramic plate 101 is used for the cap. A metal film 102 is formed on the cap so that an electromagnetic shielding effect is produced. As is the case with the first embodiment, this cap is secured using silver epoxy conductive adhesive 4, for example. In this embodiment, through the conductive adhesive 4, there is continuity between a metal film 72 on the back side of the ceramic cap substrate 101 and a ground lead 6-1. Accordingly, in this example, excellent electromagnetic shielding can be obtained, which leads to an excellent EMC property. In this embodiment, in particular, a case where ceramic is used as a base material of the cap was described. However, if the base material has a heat resistance property capable of resisting curing of a conductive adhesive, it is needless to say that even other materials such as plastic, and glass can also be used similarly if a conductive thin film is formed in a like manner.

<Seventh Embodiment>

A seventh embodiment shows an application of an optical module according to the present invention.

Figure 19:
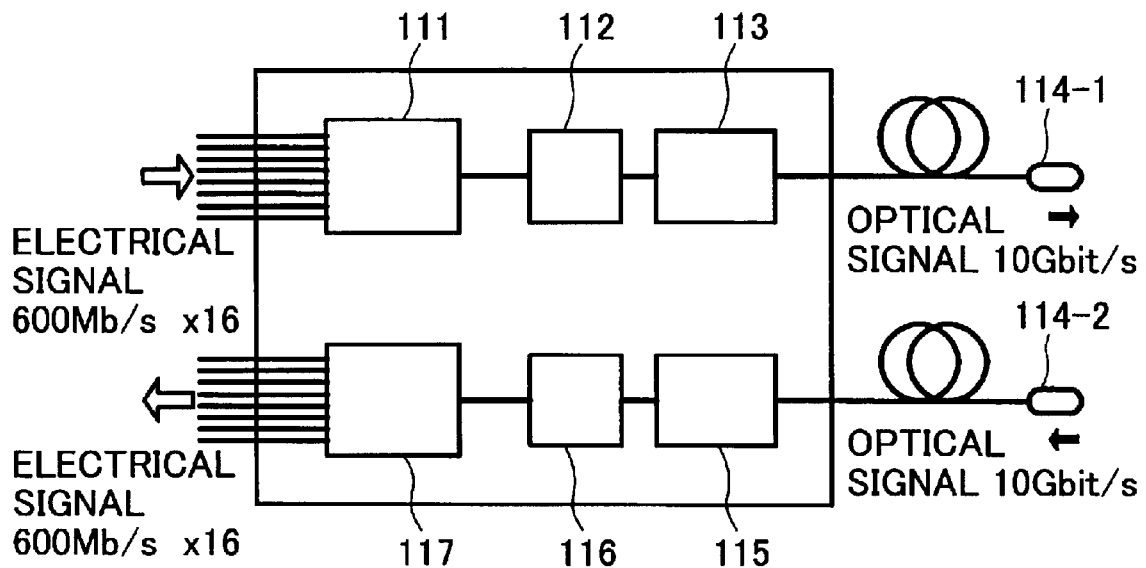
FIG. 19 is a configuration diagram illustrating an optical transceiver which uses an LD module and a PD module according to the present invention.

FIG. 19 is a schematic configuration diagram illustrating an outline of an optical transceiver which uses a LD module and a PD module according to the present invention. An electric signal of 600 Mbit/s 8 ch, which is inputted into the optical transceiver, is multiplexed by an IC 111 having a MUX (Multiplex) function, and is then converted into an electric signal of 10 Gbit/s. By a LD driver IC 112, the electric signal of 10 Gbit/s is amplified and a waveform of the electric signal is shaped. Then, the electric signal is given to a LD module 113. This LD module 113 adopts the LD module provided by the first embodiment of the present invention. Next, the converted light signal of 10 Gbit/s is output from an end of a fiber of the LD module. At the tip of a fiber pigtail of the LD module, an optical connector 114-1 for connecting a fiber is provided. A light signal of 10 Gbit/s entering from another connector 114-2 is converted into an electric signal of 10 Gbit/s by the PD module 115. As this PD module 115, the PD module presented by the second embodiment of the present invention is adopted. Jitter of the converted electric signal of 10 Gbit/s is suppressed by an IC 116 having a clock extraction function and a determining function. As a result, the signal is converted into a signal, a waveform of which is shaped. Further, this signal is converted into an electric signal of 600 Mbit/s 8 ch by an IC 117 having a DEMUX (Demultiplex) function before the electric signal is output.

Receive sensitivity of the transceiver module is −14 dBm or less. A change in receive sensitivity when a circuit on the transmitting side is turned ON and OFF, that is to say, degradation in receive sensitivity caused by crosstalk, can be sufficiently decreased as small as 0.2 dB or less. This is because in the LD module 113, the metal cap reduces radiation of electromagnetic noise while in the PD module 115, the metal cap reduces degradation in sensitivity caused by the electromagnetic noise. In other words, its main factor is that the optical module according to the present invention has an excellent EMC property.

Figure 20:
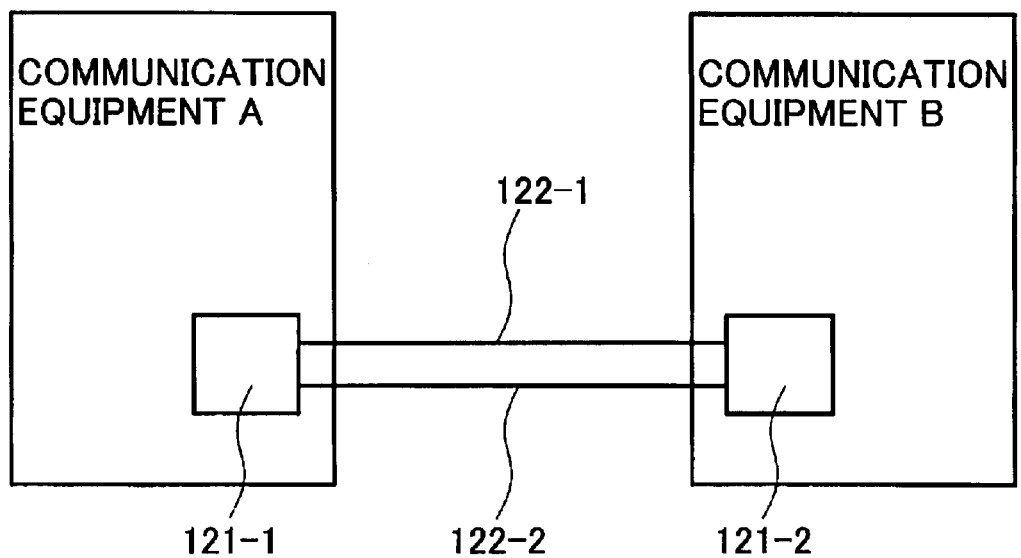
FIG. 20 is a diagram illustrating a configuration of a communication device which uses an optical transceiver according to the present invention.

Using the optical transceiver described above, an optical communication system as shown in FIG. 20, for example, can be configured. This system is composed of a communication device A and a communication device B, which have optical transceivers 121-1 and 121-2, respectively. Both of the transceivers are connected to each other using two optical fibers 122-1, 121-2. The transceivers can exchange a signal of 10 Gbit/s mutually. This communication system operates normally without error.

It is needless to say that not only the optical module used in this embodiment, but also the embodiments of the present invention described above, can be applied to a configuration of such an optical system in accordance with requirements.

<Eighth Embodiment>

An eight embodiment is characterized by securing of a cap. To be more specific, according to this means, a metal cap is provided with projections formed by punching; on the other hand, a ceramic substrate is provided with concavities corresponding to the projections; and the metal cap is fitted to the ceramic substrate to secure the metal cap to the substrate mechanically.

Figure 21:
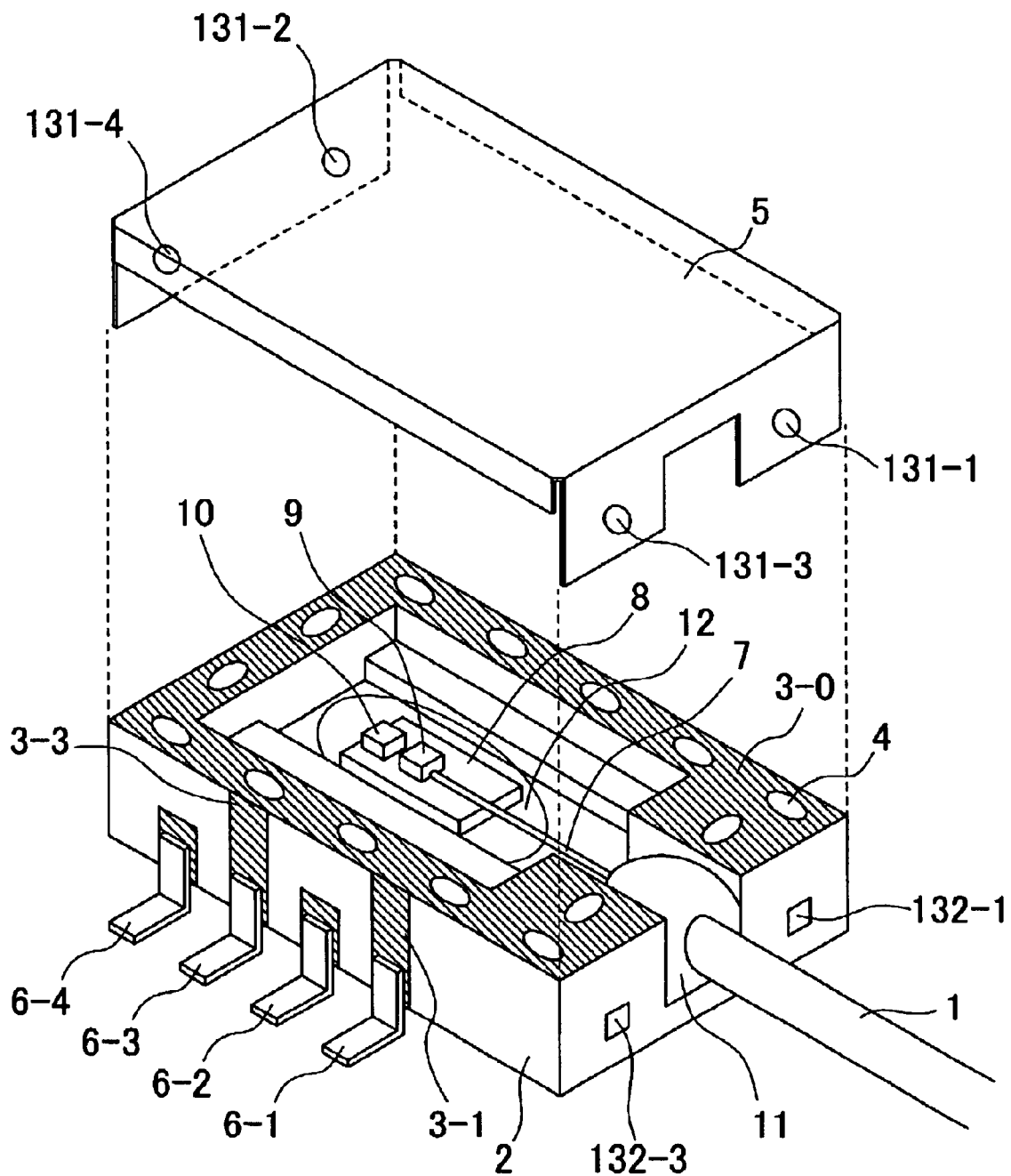
FIG. 21 is a perspective view of a LD module according to an eighth embodiment of the present invention.
Figure 22:
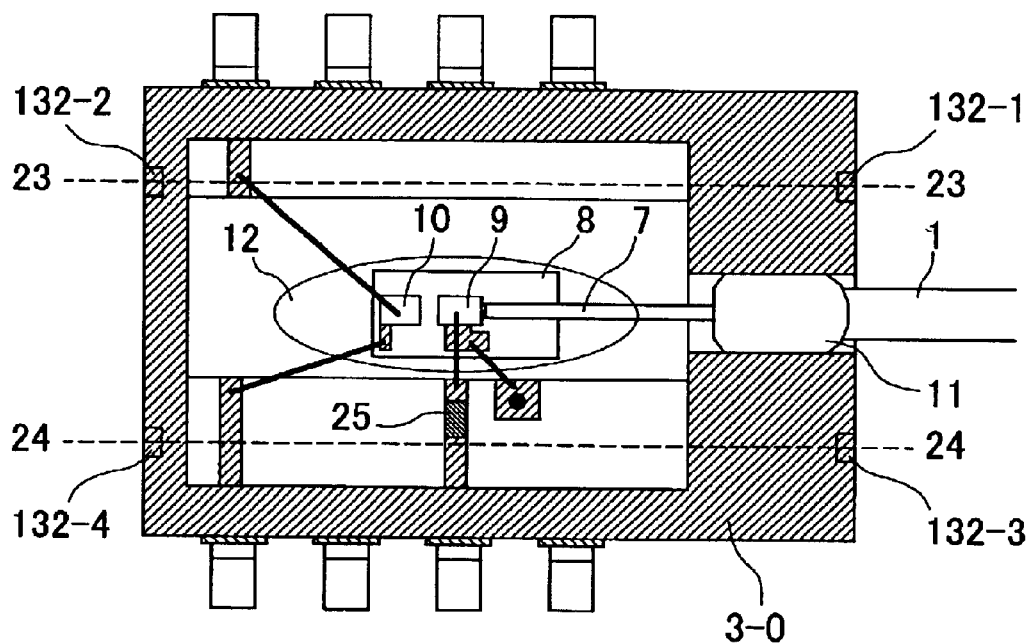
FIG. 22 is a plan view of the LD module according to the eighth embodiment of the present invention, with a cap omitted.
Figure 23:
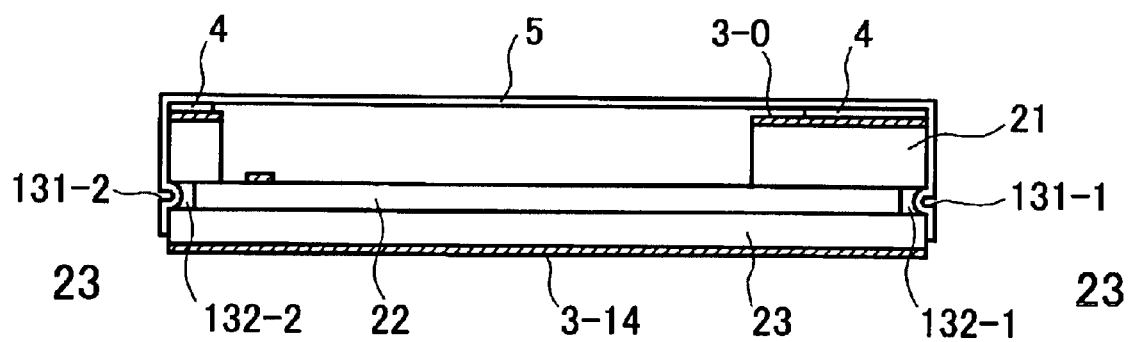
FIG. 23 is a cross section of the LD module taken along line 23—23 in FIG. 22, illustrating a state in which the LD module is capped.
Figure 24:
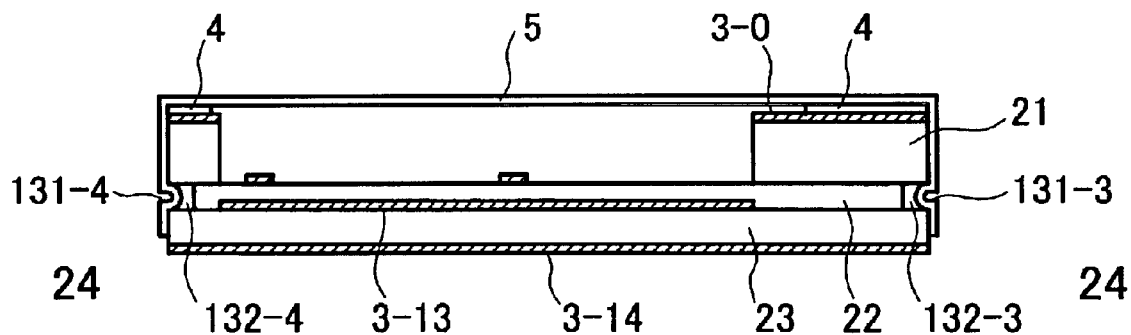
FIG. 24 is a cross section of the LD module taken along a line 24—24 in FIG. 22, illustrating a state in which the LD module is capped.
Figure 25:
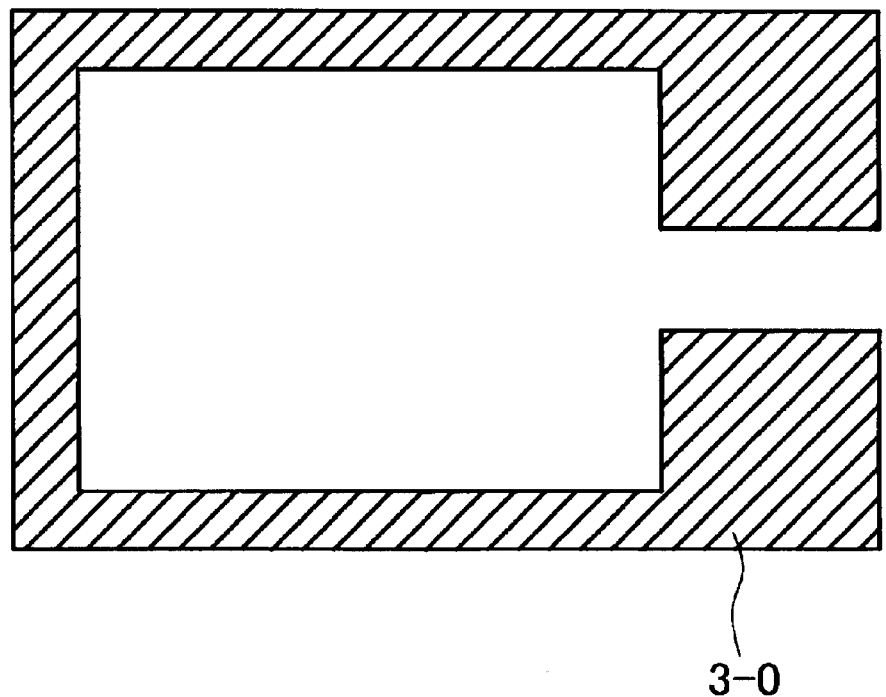
FIG. 25 is a diagram illustrating an electrode pattern provided on the top surface of a first layer of three ceramic plate layers which constitute the package main body of the LD module according to the eighth embodiment of the present invention.
Figure 26:
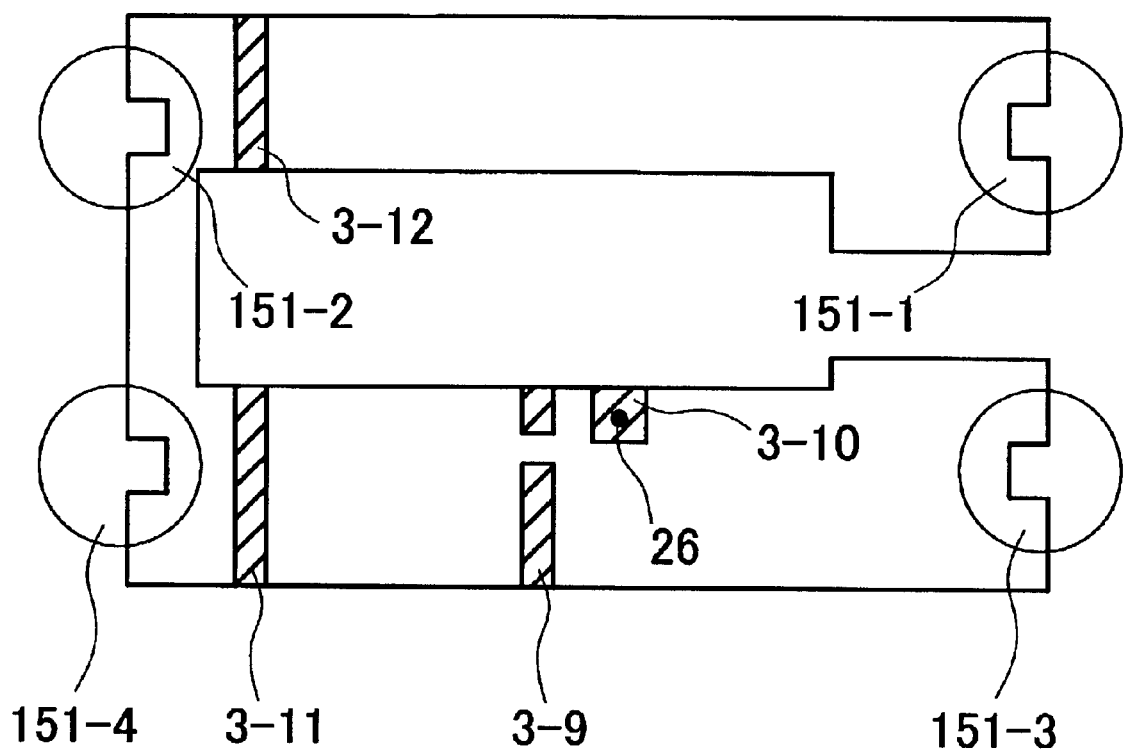
FIG. 26 is a diagram illustrating an electrode pattern provided on the top surface of a second layer of three ceramic plate layers which constitute the package main body of the LD module according to the eighth embodiment of the present invention.
Figure 27:
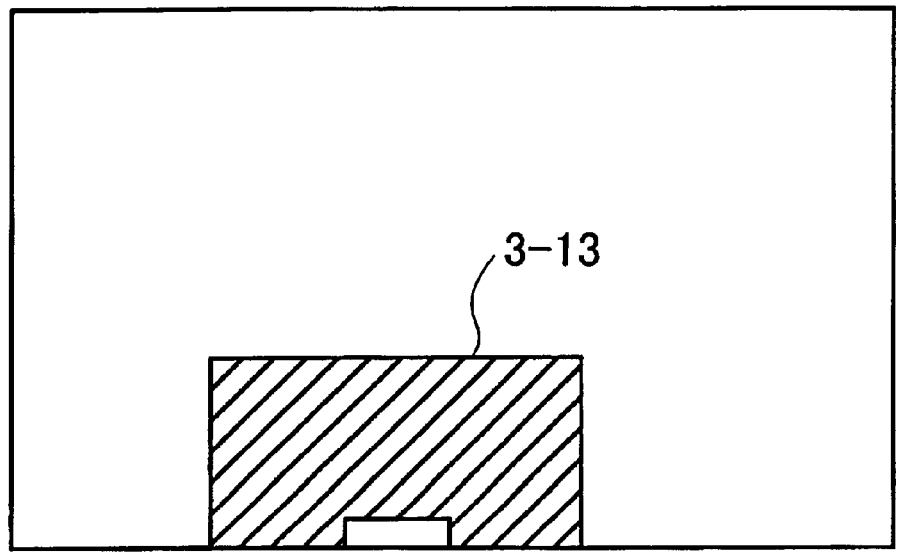
FIG. 27 is a diagram illustrating an electrode pattern provided on the top surface of a third layer of three ceramic plate layers which constitute the package main body of the LD module according to the eighth embodiment of the present invention.
Figure 28:
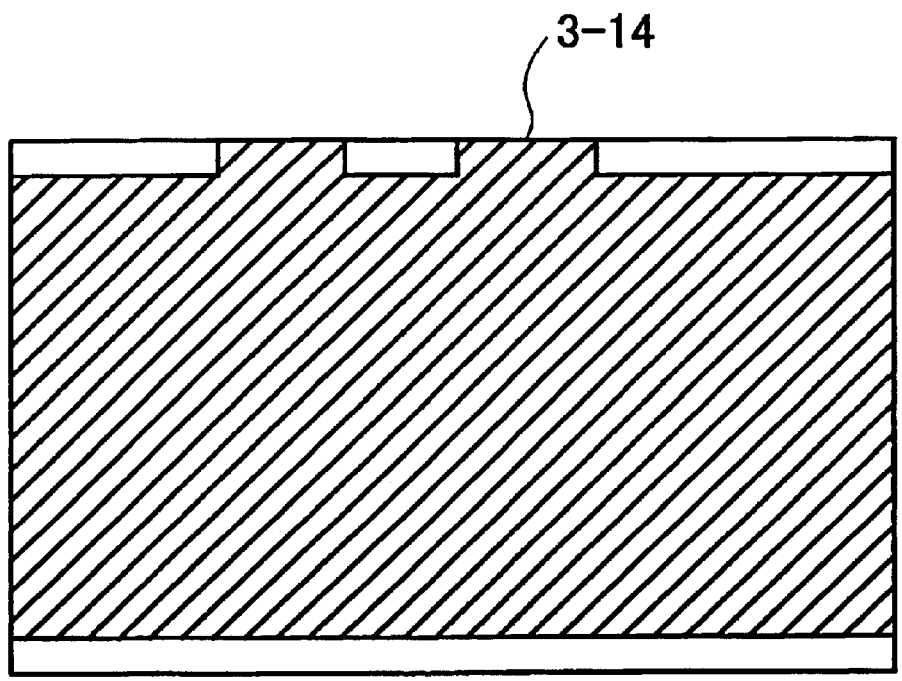
FIG. 28 is a diagram illustrating an electrode pattern provided on the under surface of the third layer of three ceramic plate layers which constitute the package main body of the LD module according to the eighth embodiment of the present invention.

FIG. 21 is a perspective view of an LD module with a fiber pigtail according to the eighth embodiment of the present invention. In order to describe the inside of the LD module, and a method for bonding the cap, the cap 5 is shifted to a position above the LD module for the sake of illustration. Here, a part of details on internal electrode patterns, wire bonds, and the like, are omitted. FIG. 22 is a plan view illustrating a state before the cap of the LD module shown in FIG. 21 is mounted. In FIG. 22, the electrode patterns, the wire bonds, and the like, inside the module are also illustrated. FIG. 23 is a cross section of the module taken along line 23—23 in FIG. 22. FIG. 24 is a cross section of the module taken along line 24—24 in FIG. 22. Both of FIGS. 23 and 24 illustrate a state in which the metal cap 5 has already been mounted. FIGS. 25 to 28 illustrate respective electrode patterns of three ceramic plate layers, which constitute the main body of the ceramic package. FIG. 25 illustrates an electrode pattern on the top surface of the first layer 21 (that is to say, on the top surface of the package main body). FIG. 26 illustrates an electrode pattern on the top surface of a second layer 22. FIG. 27 illustrates an electrode pattern on the top surface of the third layer 23. FIG. 28 illustrates an electrode pattern on the back side of the third layer 23 (that is, on the under surface of the package main body).

This module has a structure and a function that are similar to those in the first embodiment. However, in addition to bonding by a conductive adhesive 4, the metal cap is mechanically secured; that is to say, projections 131-1 to 131-4 provided on the metal cap by punching are fitted into concavities 132-1 to 132-4 provided on the ceramic main body. If the cap 5 is inserted into the main body after the conductive adhesive 4 is applied to an electrode pattern 3-0, the projections 131-1 to 131-4 are fitted into the concavities 132-1 through 132-4, respectively. As a result, the cap 5 is mechanically, temporarily secured to the main body. Baking this to cure the conductive adhesive permits the cap 5 to be secured at a target position with high strength. By the way, since other configurations are similar to those in the embodiments described above, detailed description thereof will be omitted. In the figure, like reference numerals denote like and corresponding parts.

Contrary to this configuration, a configuration which does not have such a temporary securing mechanism requires a jig for pressing the cap 4 onto the main body during baking, which is accompanied by working time for setting the cap 4 to the jig, and the like. Thus, applying the mechanical securing mechanism as described in this embodiment enables improvement in mass production using a cap securing process.

The metal cap having the mechanical securing function shown in the fourth embodiment requires bending twice so as to wrap the main body, which results in high costs for the bending. As opposed to this, the metal cap of this embodiment can be produced by bending once after punching the metal plate by a press machine and forming the projections by a punch. The present embodiment has no problem of production in particular, and provides the metal cap at low cost. In addition, the concavities provided on the ceramic main body can be produced only by the following steps: as shown in FIG. 26, when producing the main body by the green-sheet method, and when the second layer is die-cut, parts (151-1 to 151-4) of the circumferential of the second layer is also cut simultaneously.

In this embodiment, excellent electromagnetic shielding can be obtained, which leads to an excellent EMC property. The present invention provides an optical module capable of resisting high-frequency operation and being produced at low cost. The present invention is in particular useful for high-frequency operation at 10 GHz or more.

What is claimed is:

1. An optical module comprising:
    a module base;
    a lid member having a conductive function for covering the module base, the module base and the lid member forming a space therebetween;
    at least a semiconductor optical element and an electric signal wiring portion disposed in the space; and
    an optical path member which leads out of the space to the outside of the module base,
    wherein the module base is made of ceramic; at least a part of the module base has a conductive member; at least a part of the conductive member has a conductive adhesive; the module base and the lid member are bonded together by the conductive adhesive; a portion having the conductive function possessed by the lid member is electrically connected to the conductive member which is provided on at least a part of the module base; the conductive member is electrically connected to a terminal which is connected to ground; and the conductive adhesive is an organic conductivity adhesive.

2. An optical module according to claim 1, wherein the organic conductivity adhesive is an organic conductivity adhesive containing at least a conductive filler and an organic resin.

3. An optical module according to claim 2, wherein the module base is formed of a lamination of a plurality of ceramic bodies; and a conductive member is provided on at least a part of a surface of a ceramic body.

4. An optical module according to claim 3, wherein the lid member has a bent portion which partially covers at least a part of a pair of sides of the module base.

5. An optical module according to claim 3, wherein the lid member has a bent portion which partially covers at least a pair of sides of the module base;

at least the pair of the bent portions and at least a pair of sides of the module base each have fittable areas; and the fittable areas of the bent portions are fitted into the fittable areas of the sides of the module base.

6. An optical module according to claim 3, wherein a resin layer that is in contact with the semiconductor optical element is formed, said resin layer being transparent to light of said semiconductor optical element.

7. An optical module according to claim 3, wherein the lid member has a bent portion which partially covers at least a part of a pair of sides of the module base;

at least the pair of bent portion has projections;

at least the pair of sides of the module base has concavities; and the projections are fitted into the respective concavities.

8. An optical module according to claim 3, wherein the space, which is surrounded by the module base and the lid member having the conductive function, has air permeability to the outside of the space.

9. An optical module according to claim 3, wherein the organic conductivity adhesive contains silver dust and epoxy resin, and adhering temperature of the organic conductivity adhesive is 150° C. or less.

10. An optical module according to claim 2, wherein the organic conductivity adhesive contains silver dust and epoxy resin, and adhering temperature of the organic conductivity adhesive is 150° C. or less.

11. An optical module according to claim 1, wherein the lid member is made of metal, or the lid member has a layer made of a conductive material.

12. An optical module according to claim 1, wherein the lid member has a bent portion which partially covers at least a part of a pair of sides of the module base.

13. An optical module according to claim 1, wherein the module base is formed of a lamination of a plurality of ceramic bodies, and a conductive member is provided on at least a part of a surface of a ceramic body.

14. An optical module according to claim 1, wherein the lid member has a bent portion which partially covers at least a pair of sides of the module base;

at least the pair of the bent portions and at least a pair of sides of the module base each have fittable areas; and the fittable areas of the bent portions are fitted into the fittable areas of the sides of the module base.

15. An optical module according to claim 1, wherein a resin layer that is in contact with the semiconductor optical element is formed, said resin layer being transparent to light of said semiconductor optical element.

16. An optical module according to claim 1, wherein the space, which is surrounded by the module base and the lid member having the conductive function, has air permeability to the outside of the space.

17. An optical module according to claim 1, wherein the module base has a high-frequency line, impedance of which is matched with an outside line connected to the optical module.

18. An optical module according to claim 1, wherein the lid member has a base material made of at least one selected from a group of kovar, FeNi alloy, and stainless steel, and a plated layer containing Au or Pd is formed on the base material.

19. An optical module comprising:

an optical fiber or an optical connector, which is used for inputting and outputting a light signal;

a terminal for inputting or outputting an electric signal;

a main body;

a cap; and a semiconductor optical element in a space surrounded by the main body and the cap, wherein the main body has a multi-layer laminated structure formed of ceramic plates having a wiring pattern;

an electrode pattern is provided on at least a part of a surface of the main body;

the cap is bonded by an conductive adhesive which is provided on at least a part of the electrode pattern;

the electrode pattern is electrically connected to a terminal which is connected to a ground;

the conductive adhesive is an organic conductive adhesive containing at least a conductive filler and resin; and the cap is made of metal, or has a conductive film.

20. An optical module comprising:

a module base;

a lid member having an electromagnetic-wave shielding function, which is used for covering the module base, the module base and the lid member having the electromagnetic-wave shielding function forming a space therebetween;

at least a semiconductor optical element and an electric signal wiring portion disposed in the space; and an optical path member which leads out of the space to outside the module base, wherein at least the semiconductor optical element is placed on the module base;

the semiconductor optical element is covered with a transparent resin;

the module base is formed of a lamination of a plurality of ceramic bodies;

at least a part of the module base has an electrode layer;

at least a part of the electrode layer has a conductive adhesive;

the module base and the lid member are bonded together by the conductive adhesive;

the conductive member provided on at least a part of the module base is electrically connected to a terminal which is connected to a ground;

the conductive member is an organic conductivity adhesive which can be cured at 150° C. or less;

a border between the space surrounded by the module base and the lid member having the electromagnetic-wave shielding function, and a space outside the space has a structure for ventilating between both the spaces;

the lid member has a bent portion which partially covers at least a pair of sides of the module base;

the bent portion has a projection;

a rim of at least one of the plurality of ceramic bodies forming the module base has a concavity; and the projection is fitted into the concavity.

* * * * *